United States Patent [19]

Klahr

[11] 3,805,596
[45] Apr. 23, 1974

[54] HIGH RESOLUTION ULTRASONIC IMAGING SCANNER
[76] Inventor: Carl N. Klahr, 678 Cedar Lawn Ave., Lawrence, N.Y. 11559
[22] Filed: Feb. 24, 1972
[21] Appl. No.: 228,805

[52] U.S. Cl. .... 73/67.8 S, 340/5 MP, 340/15.5 AF, 340/15.5 TC
[51] Int. Cl. ............................................ G01n 29/04
[58] Field of Search........ 73/67.5 H, 67.8 R, 67.8 S, 73/67.9; 181/0.5 NP; 340/5 MP, 15.5 AF, 15.5 CC, 15.5 DP, 15.5 DS, 15.5 TC; 343/5 CM, 5 DP

[56] References Cited
UNITED STATES PATENTS
3,548,642 12/1970 Flaherty et al...................... 73/67.9

OTHER PUBLICATIONS
G. Kossoff et al., Ultrasonic Two-Dimensional Visualization For Medical Diagnosis, J.A.S.A., Nov. 1968, pp. 1,310–1,318.
W. M. Brown, An Introduction to Synthetic-Aperture Radar, IEEE Spectrum, Sept. 1969.

Primary Examiner—Richard C. Queisser
Assistant Examiner—John P. Beauchamp
Attorney, Agent, or Firm—Browdy and Neimark

[57] ABSTRACT

This invention comprises an ultrasonic imaging scanner which produces a processed signal time function for high resolution imaging of reflecting bodies in an ultrasonic propagation medium. A sequence of phase coherent ultrasonic pulse signals is produced from a set of transducer positions. The reflected pulse signals are detected and mathematically processed with specified filter functions to produce a processed signal time function from which a high resolution image of the reflecting bodies can be produced.

25 Claims, 5 Drawing Figures

HIGH RESOLUTION ULTRASONIC IMAGING SCANNER

The invention comprises an ultrasonic imaging scanner which produces a processed signal time function for high resolution imaging of reflecting bodies in an ultrasonic propagation medium.

It is well known that supersonic acoustic waves in the frequency range of 15,000 cycles per second and higher, can propagate in many solids and liquids. Ultrasonic acoustic waves are usually considered to be those in the frequency range from approximately 50,000 cycles per second to ten million cycles per second and higher. Both supersonic and ultrasonic acoustic waves are partially reflected and partially transmitted at any interface between two media of different density. It is well known that the product of material density and sonic wave velocity is the acoustic impedance, whose change from one medium to an interfacing medium determines the fraction of acoustic radiation which is reflected when it impinges on the interface. It is well known that pulses of acoustic waves can be used for echo ranging of distances from an interface, by measuring the time interval from initiation of the pulse to the return of the echo to the acoustic source. A time interval $\Delta t$ is obtained, given by $$\Delta t = 2R/C$$

where $R$ is the source to interface distance, and $C$ is the acoustic speed.

Ultrasonic echo ranging and ultrasonic imaging are used in many medical applications and in nondestructive testing and analysis of various structures. The attenuation in soft tissue is relatively low and a difference in acoustic impedance leads to reflection. The ultrasonic frequency range from about 1 megahertz to 10 megahertz is commonly used, wherein a megahertz is 1 million cycles per second. The ultrasonic pulses consist of a number of waves whose wavelength, $\lambda$, is given in terms of its frequency $\nu$ by $$\lambda = C/\nu$$

The speed C in many liquids as well as in human tissue is about 1,500 meters per second. Thus a one megacycle wave has a wavelength of about 1.5 millimeters and a ten megacycle wave about 0.15 millimeters.

Acoustic transducers, which in the ultrasonic frequency range are called ultrasonic transducers, are well known. These are often crystalline material with electrostrictive, piezoelectric, or magnetostrictive properties. Some examples of piezoelectric materials are quartz, lead zirconium titanate, barium titanate and niobium titanate. In an electrostrictive crystal, for example, an oscillatory electric field applied across the crystal produces mechanical oscillations whose amplitude and frequency depend on the dimensions and cut off the crystal, as well as on the frequency of the applied electric field. In an efficient transducer the mechanical resonant frequency of the crystal is matched with the electronic frequency which excites the crystal. The crystal material properties, as well as its cut, its dimensions, and its mounting determine its mechanical resonant frequency. Characteristic dimensions are measured in terms of the wavelength of the resonant frequency.

Ultrasonic waves can also be detected with such transducers. As a detector the transducer produces an electric potential with the frequency of the impinging ultrasonic radiation. In a piezoelectric crystal, for example, the detection process is the inverse of the process producing the ultrasonic wave. In many applications the same transducer is used for producing the radiation and for detecting the back-reflected radiation. The exciting voltage is applied for a short pulse interval, i.e., the period for several cycles, and then turned off. The transducer is highly damped to prevent its continued oscillation after the exciting voltage is turned off. The transducer is then connected, by means of a multiplexer or electronic switch, to an amplifying and detecting circuit. When the reflected ultrasonic pulse returns to the transducer it sets up mechanical oscillations which the transducer, now acting as a detector, converts into electrical oscillations by the piezoelectric or electrostrictive effect. These electrical oscillations are amplified and detected. Corresponding action can be obtained with magnetostrictive and electromagnetic transducers. This technology is well known.

It has long been known that ultrasonic reflection can potentially be used for imaging reflecting bodies within an ultrasonic propagation medium. The organs of the human body as well as bones and sinew are reflecting bodies within the soft tissue of the body. Any foreign inclusion is also a reflecting body. Thus ultrasonic imaging can be used for internal examination of the body. It can also be used for examination of mechanical structures for flaws or cracks, which act as internal reflecting bodies.

An ultrasonic imaging system typically consists of three functional units: (1) a scanner which produces a sequence of electronic signals representing the back reflected ultrasonic pulses including their time functional form; (2) a display device, e.g., a cathode ray tube for producing a visible display of said back-reflected signals in the form of optical spot resolution elements representing each of the back reflected pulses; (3) an electronic synchronizing unit which selects the display coordinate position for the back-reflected signal from the scanner, according to the one or two dimensional position scanning procedure which the scanner utilizes.

The ultrasonic scanner includes an ultrasonic transducer for producing the source pulses. The same transducer is often used to detect the back-reflected pulses, though another transducer may also be used. The transducer is mechanically moved over a contour outside the ultrasonic propagation medium to scan the internal reflecting bodies. This scan may be automatized by attaching the transducer head to a drive mechanism. Location sensors from this drive mechanism can then provide the electrical signals for the synchronising unit which correlates the display coordinate position on the cathode ray tube with the back-reflected signal detected by the transducer.

It will be understood that the scanner includes a high frequency electrical power source for application of high frequency electrical voltages to the transducer to produce the ultrasonic waves. In a piezoelectric transducer the ultrasonic waves are produced directly from the electrical oscillations. In a magnetostrictive transducer, e.g., nickel, a magnetic coil receives the electrical oscillations and converts them into magnetic oscillations which produce ultrasonic waves from the magnetostrictive material. The scanner must also include signal detector circuits for processing the backreflected electronic signal produced by the transducer which functions as the detector. A set of electronic switches must also be provided to (1) connect the transducer to the high frequency power source during the pulse period, and then to (2) disconnect the transducer from the power source, and connect it to the detector circuit for the back-reflected pulse signal processing. It will be understood that the technology of such scanners is well known and ultrasonic imaging systems of this general type have been extensively fabricated and are commercially available. The July 1970 issue of IEEE Transactions on Sonics and Ultrasonics, volume SU-17, number 3, includes a number of papers on ultrasonic imaging, as well as other papers on ultrasonic echo-ranging. This issue incidentally describes some of the apparatus used in such applications. Particular attention is directed to the article by Fry et al. in this issue, page 169 of which shows ultrasonic images of brain lesions.

Any ultrasonic imaging situation can be considered as a set of reflecting bodies within an ultrasonic propagation medium.

Ultrasonic imaging systems can be two dimensional, giving a view of a cross sectional slice through the object viewed, in which the traverse of the transducer parallel to the surface is one dimension of the slice, and the direction normal to the surface is the other dimension. This imaging technique is often called ultrasonic laminography because it produces images of slices or thin layers, hence the term lamina. The two dimensions of such a view will be termed the range dimension, normal to the surface, and the lateral or azimuthal dimension, parallel to the motion of the transducer along the surface.

The usefulness of any imaging system depends on the resolution of the image produced. Resolution will be defined as the minamal spatial separation between any two points on the reflecting body being viewed which can be distinguished from one another. The smaller this distinguishable spatial separation, the higher the resolution is said to be. In optics the resolution of an instrument is defined to be the reciprocal of the smallest angle of divergence between two beams which can be resolved by the instrument. It can be shown that for an optical instrument of aperture $d$ and optical wavelength $\lambda$, the smallest divergence angle resolvable is approximately $0.61 \lambda/d$ known as the Rayleighs criterion leading to a resolution $1.22 d/\lambda$.

Other resolution criteria have been proposed in addition to Rayleighs. These differ in the criterion for the minimum resolvable angle which is $0.61 \lambda/d$ by Rayleighs criterion. No resolution criterion has specified a minimum resolvable angle less than one-half Rayleighs value. Thus $0.31 \lambda/d$ is the minimum resolvable angle according to any practical criterion.

The basic phenomenon involved in high resolution viewing is diffraction of the scattered waves. Diffraction is defined as constructive or destructive interference from a wave front, which permits scattered waves from a large aperture to add up in phase at any point. Any wave phenomenon, optical, acoustic, or ultrasonic, is subject to such constructive or destructive interference. The requirement for diffraction is phase coherence of the scattered wave, which will be defined in the description given below.

In the ensuing description it will be convenient to use the following terms. The traverse or aperture of the transducer is defined as the length in one dimension, usually the azimuthal dimension, over which the transducer position is replicated. Replicas or copies of the transducer may be placed at a succession of positions along this aperture. These replicated positions of the transducer may be made simultaneous in time by placing an array of transducers at the selected positions. However, the replication need not be simultaneous in time. A single transducer or several transducers may be placed at successive times in the sequence of positions selected along the aperture. When the transducer moves to a succession of positions along this aperture, the aperture is called a traverse and the replication of transducer positions may be obtained with a single transducer which is placed at successive times at the selected succession of positions along the aperture or traverse.

When these optical concepts are applied to ultrasonics the diffraction aperture, $d$ becomes the traverse distance of the transducer and the wavelength $\lambda$ is the ultrasonic wavelength. Thus in a reflecting body in an ultrasonic medium one should be able to distinguish two points separated by a distance of approximately $\lambda$ at a viewing distance equal to the aperture. Since $\lambda$ is 1.5 mm for 1 megahertz frequency or 0.15 mm for 10 megahertz it is apparent that with transducer traverses of 10 to 30 cm one should be able to distinguish points which are very close together and thus obtain a high resolution image. Such high resolution images are not obtained by current ultrasonic imaging methods. The object of the present invention is to obtain high resolution ultrasonic imaging by the structures to be described.

The current status of ultrasonic imaging as applied to biological diagnostic problems is described by F.L. Thurstone in an article entitled "Acoustical Imaging of Biological Tissue" in the IEEE Trans. on Sonics and Ultrasonics, vol SU-17, No. 3, July 1970, pp 154-157. The following disadvantages of the present technology are pointed out or can be realized from Thurstones article.

1. In order to obtain good resolution it is customary to use large transducers, since the angular width of the ultrasonic beam in the far field is given by $\theta = \lambda/d_r$, where $d_r$ is the transducer diameter. Thus if $d_r/\lambda$ is 10 or more one has a well collimated beam which is confined within a narrow angular width, of 1/10 radian or 6°. This collimated beam gives much better resolution in illuminating the reflecting body with ultrasonic radiation than would an uncollimated beam. However, the same large width of the transducer gives a large detection area, which reduces the resolution in detection, since the entire reflected pulse cannot be localised to greater precision than the detection area. Also the resolution does not approach the theoretically attainable resolution previously discussed, since the transducer diameter is much less than the traverse length.

2. The use of a large transducer area to give a well collimated beam in the far field leads to reduced resolution in the near field. Thus when one obtains good resolution at large ranges (the far field) one has poor resolution at short range (the near field). The transition range $R_T$ between near field and far field is $R_T = d_T^2/\lambda$. A compromise must be made between reduced azimuthal (lateral) resolution in the far field for small transducers and reduced azimuthal resolution in the near field for large transducers.

3. The ultrasonic beam from a transducer is sometimes focussed with a lens or reflecting system to overcome the near field - far field problem. Focussing can also be done by using a curved transducer. But if focussed beams are used to give better resolution at the focal distance it is at the expense of degraded resolution at distances greatly different than the focal length. One cannot obtain good azimuthal resolution at all ranges by such methods, and if range-gating is used this decreases the data acquisition rate.

4. Present systems which use large transducers (in terms of the ultrasonic wavelength) have complex ultrasonic beam patterns with extensive lobe structure, both in the near and far fields. This degrades the resolution since one obtains back reflection over a range of angles determined by the lobe structure. Even on the transducer axis there are multiple nulls in the near field. Thus there are many possibilities for reflecting bodies which will not be seen at near ranges.

5. Biological tissue structures tend to reflect ultrasound in a specular manner. Hence if the structure surface is normal to the ultrasonic beam it will be reflected back to the transducer; otherwise the reflected signal will not reach the transducer because of the beam collimation. The use of collimated ultrasonic beams for high resolution can miss non-normal structures. One solution might be to use diffuse beams of braod angular width but this would greatly decrease the image resolution.

6. In order to image curved and complex structures with a well collimated beam from a large transducer it is necessary to scan the beam over a range of angles by rocking the transducer over a range of angles, and to include a large dynamic range of echo information in the image. But the use of a wide angular range with a large transducer leads to including spurious image artifacts produced by the spurious response of the side lobes of the transducer.

7. The limited dynamic range of display devices requires that the range of pulse reflection echos must be compressed to include all the image information. But if this range is compressed by using a variable gain amplifier one will include the spurious side lobe returns of the transducer.

These are some of the practical difficulties that prevent one from obtaining a high resolution image by presently known ultrasonic techniques. The present invention provides an ultrasonic scanner which can produce a back-reflected pulse signal time function which can give a high resolution image. This new scanner will utilize the entire transducer traverse dimension L as the aperture for resolving the return back-reflected signal. In this way the image resolution will approximate the theoretical value of approximately $L/\lambda$.

The basic concept of the present invention is to utilize most of the diffracted wave from each resolution element of the reflecting body to obtain high resolution viewing. This will be performed by a system based on the following principles:

a. a sensing transducer of wide angular beamwidth is used, which is sensitive to most of the diffracted wave from the minimal specified resolution element of the reflected body.

The angular beamwidth to which a transducer is sensitive may be defined as the angular range within which the received signal is within some small specified decrement from its maximum received signal, for an angularly isotropic incident beam. It is usual in some applications to specify a 3 DB limit for this angular range of sensitivity. The sensitivity range specifies the principal angular detection lobe of the transducer beam pattern within which its reception is high enough to be considered uniform.

It will be noted that this invention specifies a wide angular beamwidth for the sensing transducer, which is directly contrary to the present practice of a small beam-width, i.e., a collimated beam. A wide angular beamwidth implies a small transducer diameter, in terms of $\lambda$.

b. the effective aperture of the system is the entire range of positions over which the sensing transducer can be placed.

The sensing transducer must be replicated over its range of positions, i.e., over the effective aperture to be used. The spacing of this replication will be described subsequently.

c. the individual pulses, which may but need not, originate from the entire range of transducer positions, are phase coherent with respect to each other, thus permitting the diffracted waves from each resolution element of the reflecting body to be coherently sensed and detected over the entire receiving aperture, comprising the entire range of positions over which the sensing transducer can be placed or replicated. However, only a limited range of radiation transducer positions is necessary for high resolution viewing of a part of the scene. A back-reflected time signal is formed from the sensor transducer location outputs in which the reflected pulse signal time-function from each sensing transducer can be separately identified. This signal time-function is detected before the final processing operation.

d. a mathematical processing operation is performed on these back-reflected signal time functions with a filter function characterizing the coherent signal collection and propagation process. This mathematical process extracts the reflecting body processed signal time function which can be used for high resolution viewing.

It will be understood that a high resolution imaging system requires the specification of the azimuthal minimal resolved width to be obtained with the system. Hence it is apparent that some component and system properties must be specified in terms of this key design parameter.

Before describing typical embodiments of this invention it is relevant to present technical background information pertinent to the principles enumerated above to facilitate the specific description of structures for this invention.

An important element of the present invention is the use of an ultrasonic transducer of relatively small diameter as the ultrasonic reflected pulse sensing element. I shall refer to such a small diameter transducer as an ultrasonic sensing transducer. It will be apparent from the discussion to follow that the diameter required for the ultrasonic sensing transducer must not be greater than approximately 1.22 times the minimum azimuthal resolved width which is specified for the system according to Rayleighs criterion or twice this value by other criteria have been used by Abbe and by Sommerfeld in his book on Optics. Since in many cases this minimum resolved width will be specified to be as small as possible, of the order of an ultrasonic wavelength, the sensing transducer will often have a diameter of the order of an ultrasonic wavelength.

It will be advantageous in many situations to use one type of ultrasonic transducer for radiating the ultrasonic pulse and another type of transducer for sensing the back reflected pulse. Thus one can refer to an ultrasonic radiation transducer as well as to an ultrasonic sensing transducer. The radiation transducer can be designed to emit a large power pulse, and to emit it as a well-collimated beam, i.e., within a narrow cone angle. These properties will require a transducer whose diameter is large compared to the ultrasonic wavelength, since the power radiated is proportional to the area and the angular width of the collimated beam is inversely proportional to the diameter. On the other hand, the ultrasonic sensing transducer will be designed to have a small diameter of the order of the minimum azimuthal resolved width specified for the system, which may be as small as the ultrasonic wavelength. The small diameter will lead to precise spatial definition of the receiving point, and to a wide angular beamwidth, for sensitivity over a wide angular back-reflected beam. The same property of small size which leads to precise spatial definition of the sensing transducer gives it the desired wide angular beamwidth.

In the description above I have referred to the diameter of the transducer, a term which is strictly applicable only if the transducer is a cylindrical disk. Actually one can use a large variety of transducer shapes, and the size restriction can refer to the minimal dimension in the azimuthal direction normal to the beam, in which one requires a wide beam angle in the case of the sensing transducer, or in which one desires a narrow beam angle in the case of the radiation transducer. It will be understood that the area of the transducer normal to the ultrasonic beam may be narrow in one dimension, in which one requires a wide beam angle, and broad in the other dimension, in which a narrow beam angle is acceptable.

It will also be understood that in many applications it may be advantageous to use the sensing transducer as the radiation transducer. In this case one either forgoes the advantage of large radiation transducer area, or one obtains it despite the narrow width in the azimuthal dimension by means of a large length in the other dimension of its area.

In summary, the sensing transducer will have in at least one dimension a maximum width of the order of twice the minimum azimuthal resolved width specified in the direction of desired large angular beamwidth.

A basic distinction between the present invention and previous methods for ultrasonic imaging is that of phase coherence of the transducer pulses used in the scanning procedure. The property of phase coherence applies to a collection of two or more individual oscillatory motions, e.g., ultrasonic waves in the pulses produced by a number of individual transducers, or by a single transducer at different locations and at different times. Each such oscillatory motion is characterized by an amplitude of oscillation and by a phase. If their phase relationship is such that their oscillation amplitudes are additive, the individual oscillatory motions are said to be phase coherent. It is well known that if there is a fixed and predetermined phase relationship between the individual oscillatory motions, then their amplitudes can be added to produce a total amplitude to describe the oscillation. In this case their total effect is that of one single large oscillatory motion covering the entire replication or aperture of transducer positions or covering the entire dimension of the transducer array (if an array of transducers is used to produce the pulses). If, however, the oscillatory wave motion of the individual pulses bear no fixed phase relationship to each other, the pulses can be said to be phase incoherent. The individual pulse signals when added together will lead to no common sum amplitude for an overall wave. Hence the effect is that of many unrelated wave motions, not of one overall wave.

In summary, when the oscillatory motions originate from a number of individual locations distributed over an aperture, their summed signal amplitude is that of one large area wave if the individual pulse oscillatory motions are phase coherent. This will be true even though the pulses occur at different times, since the signal amplitudes are additive. However, if there is no fixed phase relationship there is no summed signal amplitude and their effect is that of many individual independent wave oscillations.

In order to produce the individual pulses to be phase coherent with one another, it is necessary to produce the pulses from a single reference oscillator which maintains its phase stability. The technology of phase stable electronic oscillators is well known. Such a phase stable oscillator can be used to stabilize an ultrasonic power source from which the pulse energy is drawn. Thus the use of a phase stable ultrasonic power source to produce the individual ultrasonic pulses permits one to maintain a fixed phase relationship between the individual pulses. One can program the initial phase at the beginning of each pulse by selecting the time initiation point of each pulse. Thus, for example, all pulses can start with the same initial phase value. Alternatively, the initial phase values may depend on the transducer position. For example, if the transducer positions are equally spaced along a line with spacing $d$ wherein the initial phase of the $n$-th transducer is $n$ times a constant phase value $\phi_o$, where $$\phi_o = (2\pi d/\lambda) \sin \theta$$

the summed oscillatory motion corresponds to an ultrasonic beam at angle $\theta$ from the transducer position array line.

Each of the four principles of this invention referred to above will now be described.

The sensing transducers must have a minimal angular beamwidth $\Delta\theta$ given by $$\sin \Delta\theta \geq 0.61 \, \lambda/\Delta u$$

according to Rayleighs resolution criterion or by $$\sin \Delta\theta \geq 0.31 \, \lambda/\Delta u$$

according to any resolution criterion, where $\lambda$ is the ultrasonic wavelength and $\Delta u$ is the minimal resolved azimuthal width which is specified for the system. That is, if one desires that two points on the reflecting body separated by an azimuthal distance $\Delta u$ shall be individually resolved then the transducer must have a minimal angular beamwidth given by the expression above. This can be mathematically demonstrated following Rayleighs theory of resolution, as follows. A resolution element $\Delta u$ spreads its diffracted beam over a diffraction angle given by $\Delta\theta$ above. If the sensing transducers are at a range R from the reflecting body, this will require an aperture $\Delta X = 0.61\ \lambda/\Delta U \cdot R$ over which sensing transducers must be sensitive to this diffracted beam. They can only receive parts of this beam if they each have a minimum beamwidth of Sin $\Delta\theta = \Delta X/R$ given by the above expression.

The sensing transducer can be replicated over a range of positions by a number of means. One method is to supply mechanical means for moving a single sensing transducer over a traverse. Another method is to provide an entire array of sensing transducers over the traverse and to select, e.g., by electronic means, the outputs of the individual transducers desired. These methods will be described below. Either method can also be used to position the pulsing sequence of radiation transducers over a range of positions.

In this description the term transducer array can be defined as a spaced sequence of transducers in a predetermined spatial pattern arrangement.

One may use the sensing transducers themselves as radiation transducers, or one may use different transducer types for the sensing transducer and the radiation transducer. Thus there are six possibilities:
1. moving sensing transducers,
   moving radiation transducers
2. fixed array of sensing transducers
   moving radiation transducers
3. moving sensing transducers,
   fixed array of radiation transducers
4. fixed array of sensing transducer,
   fixed array of radiation transducers
5. moving transducers used as both
   sensing and radiation transducers
6. fixed array of tranducers, used as both
   sensing and radiation transducers In all cases, the sensing transducer must have the large angular beamwidth sensitivity given by Sin $\Delta\theta \geq 0.61\ \lambda/\Delta U$ according to Rayleigh or by Sin $\Delta\theta \geq 0.31\ \lambda/\Delta U$ according to any other resolution criterion. It will be understood that when one speaks of replication of a transducer one is only concerned with this property of angular beamwidth sensitivity and not with any other mechanical or structural property of the transducer.

The present invention utilizes a series of transducer positions from which ultrasonic pulses are emitted to scan reflecting bodies in an ultrasonic propagation medium. These ultrasonic pulses are phase coherent with each other. Electronic switching or multiplexing is used to apply high frequency electrical oscillations to each transducer position with predetermined phase values. The high frequency electrical oscillations are produced by a source oscillator which is phase stabilized throughout the scanning process to produce a phase coherent source from which predetermined and controlled phase values can be selected for the initiation of each pulse. Electronic switching or multiplexing is also used to discontinue the excitation of each pulse after the appropriate period (usually several cycles) and to switch each transducer in appropriate sequence to the detector circuits, where the back-reflected pulse reaching the selected transducer is processed, as described below. The technology of such electronic switching or multiplexing is well known.

The detection process consists of separating the information about the reflecting body from the ultrasonic carrier wave. This must be done without destroying the phase information in the signal, since the phase information permits coherent summation of the back-reflected pulses from the transducer positions. The technology of this process, termed coherent or synchronous detection, is well known and will be summarized subsequently in this description.

The individual detected transducer pulses will usually be sequential in time, although in some embodiments of this invention they may be simultaneous in time. Even if they are sequential in time they can maintain their phase coherent relationship with one another as if they come from a simultaneously pulsed source. If a definite sequence of pulsing is maintained across the transducer array or traverse of positions the pulse origin and sensing positions can be thereby identified, according to well known methods in electronic signal processing.

There is no necessity that the individual spatial contributions to a coherent wave front shall be detected and processed simultaneously in time. It is only necessary that their phase coherent relationship shall be maintained in the detection process. This can be done so long as a single phase coherent oscillator source is used to produce the individual pulses, which may be spatially separated from each other in their point of origin; and so long as a definite sequence of pulsing and reflected signal processing is maintained in the system.

The sequence of coherent reflection pulse time functions will then be mathematically processed to obtain a processed signal function characterising the reflection geometry of the target body being scanned. A processed reflected signal time function will be obtained from this processing wherein each time point characterises a single spatial point of the reflecting body, to within the specified minimal azimuthal resolution width $\Delta U$. This processing is a mathematical convolution of the coherent reflected pulse time function with a prescribed filter function. The filter function to be used in the convolution is the mathematical inverse to a filter function which characterises a single reflecting point return from the reflecting body, and is determined by the radiation transducer properties, the sensing transducer properties, the geometry and the ultrasonic propagation medium. This mathematical processing can preserve range information as well as azimuthal reflection information in the back-reflected pulses. A detailed description of the mathematical processing will be given below.

The differences between the present invention and previous ultra-sonic scanning methods can be summarised as follows:
1. The effective aperture of the scanner is the entire traverse of sensing transducer positions, not the diameter of a single transducer, as in previous ultrasonic scanners.
2. The use of phase coherent ultrasonic pulses from the radiation transducers permits the entire set of transducer positions to constitute a single effective aperture. Previous ultrasonic imaging scanners did not set up any definite phase relation between the ultrasonic pulses produced at the various transducer locations. In such systems the pulses are incoherent with one another and cannot be considered to comprise a single waveform diffracted from the reflecting body. In the present invention, however, the use of a set of phase coherent pulses at the individual transducer locations is equivalent to the use of a single waveform over the entire array or traverse of transducer positions.

3. The individual transducer pulses in the present invention maintain their phase coherent relationship with one another even though they are not emitted simultaneously but are sequential in time. There is no necessity that individual spatial contributions to a coherent wave front must be detected and processed simultaneously 4. The mathematical processing of the sequence of coherent pulse reflections by means of convolution calculation with the appropriate inverse filter function is unique to the present invention. It is not used in previous ultrasonic scanners.

5. The present invention uses a small diameter sensing transducer which is sensitive to a wide angled ultrasonic beam. Previous ultrasonic scanners normally used collimated beam sensing transducers of large diameter. The use of a small diameter sensing transducer has another advantage. It avoids the complex lobe structure of large diameter sensing tranducers. One can therefore use a variable gain detector to compensate for attenuation of the back-reflected signal with increasing range, without being concerned with spurious side lobe effects.

6. The specular reflection problems of biological tissue, can be avoided in several ways: In one method wide beam angle transducers may be used to irradiate the reflecting surface with a diffuse array of beam angles that will give significant reflection from surfaces of any shape. In another method the phase coherent pulses from the individual transducer locations can have any predetermined phase relationship. The phase relationship may be that for a monodirectional beam coming in at an arbitrary angle, in which the angle can be varied during the course of a set of irradiations. This will be described below. The effect is that of irradiation of each surface from a variety of directions.

This new invention obtains the required high imaging resolution by generating ultrasonic signals from a number of individual transducer positions to combine them into the equivalent of a single large aperture transducer. This is done by making all the pulses originating from the individual transducers coherent with one another. Then one sums the back-reflected ultrasonic echos originating from the individual transducers in phase with one another to give the same reflected signal time function that one would obtain from a single large aperture transducer. The reflected signal time function is obtained by piecing together in a predetermined sequence the back-reflected signals from the individual transducer detectors. Although they are sequential in time the signals can be added directly because they are phase coherent. The result is the same as if all had been received simultaneously. This utilizes the additive property of the individual back-reflected signals when they are phase coherent in predetermined phase relationship with one another.

Structural embodiment of this high resolution ultrasonic scanner invention will comprise three subsystems:

1. the transducer section and associated structures
2. the pulsing and multiplexing subsystem and associated electronic controls
3. the signal processing and image signal extraction subsystem The basic structural principles by which the various embodiments of this invention are operative may be described with reference to the following Figures which illustrate the three subsystems of this invention.

FIGS. 1 and 2 refer to the transducer subsystem of the high resolution scanner.

FIGS. 3 and 4 refer to the multiplexing and pulsing subsystem of the high resolution scanner.

FIG. 5 refers to the signal processing and image signal extraction subsystem of the high resolution scanner.

FIG. 1 shows the basic structural principles of the transducer subsystem of this invention in embodiments which utilize a moving transducer traverse for the sensing transducer and the radiation transducer. FIG. 2 shows the basic structural principles of the transducer subsystem of this invention in embodiments which utilize a transducer array for the sensing transducer and for the radiation transducer.

Figure 1:
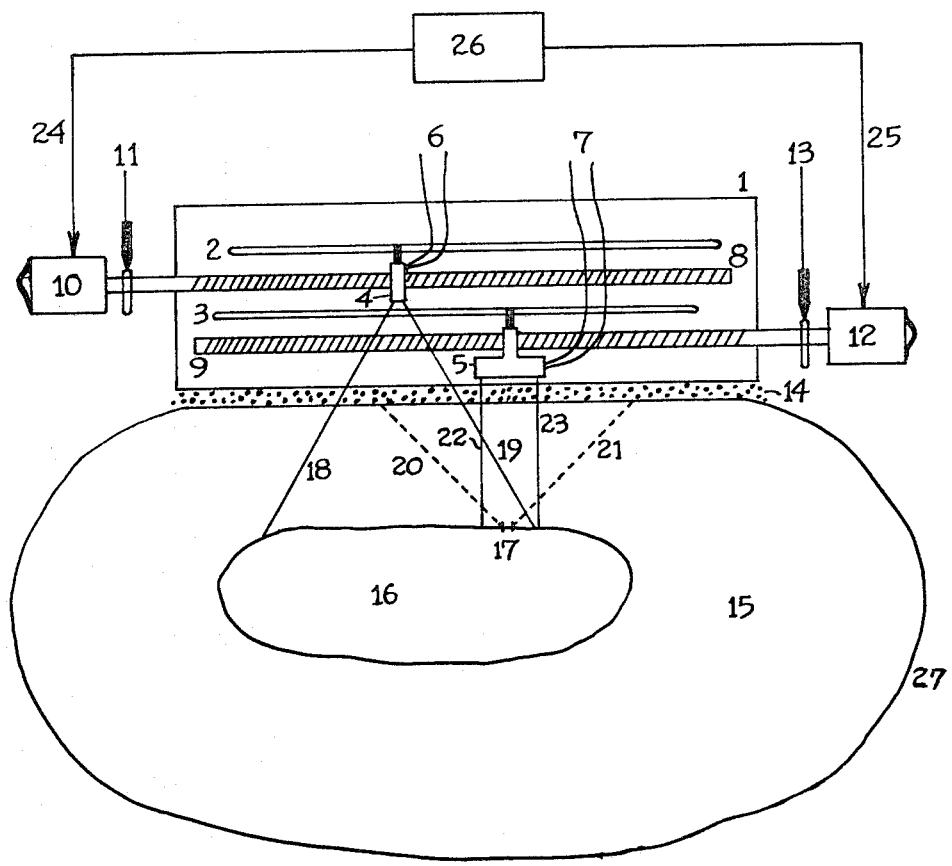

With reference to FIG. 1, which shows the basic structure of the transducer subsystem in cross section view in embodiments utilizing moving transducers, the components are as follow: A support frame, denoted by 1, for traverse of the transducer or transducers, holds a support track, denoted by 2, for the sensing transducer, and another support track, denoted by 3 for the radiation transducer. The sensing transducer, denoted by 4, fits into the track 2 and can move smoothly in it; the radiation transducer, denoted by 5, fits into the support tract 3 and can move smoothly in it. The sensing transducer, denoted by 4, has electrical lead wires, denoted by 6, extending from it, from which an output signal can be taken; the radiation transducer, denoted by 5, has electrical lead wires, denoted by 7, extending from it, into which a high frequency electrical pulse signal can be inputted to produce an ultrasonic pulse. The sensing and radiation transducers each move in support tracks in closely spaced planes in close proximity to the ultrasonic propagation medium for good coupling to the medium. The spacing of the transducers is such that they do not impede each others motions across the traverse defined by the horizontal length of the support frame. This traverse length defines the coherent aperture of the transducers.

A drive rod, denoted by 8 imparts linear motion to the sensing transducer. It is moved, by the drive motor, denoted by 10, whose motion is programmed by an electrical drive signal denoted by 24, for a particular mode of motion of the transducer. A location sensor, denoted 11, monitors the location of the sensing transducer from the motion of the drive rod, and delivers its location signal to the timing function generator shown in FIG. 3 for use in timing the collection of back-reflected signal sensed by the sensing transducer. The drive rod denoted by 9 imparts linear motion to the radiation transducer. It is moved by the drive motor, denoted by 12, whose motion is programmed by an electrical drive signal, denoted by 25, for a particular mode of motion of this transducer. A drive signal programmer, denoted by 26 produces the electrical drive signals denoted by 24 and 25, and is synchronized with the sweep rate of a display device, shown in FIG. 5. A location sensor, denoted by 13, monitors the location of the radiation transducer from the motion of its drive rod, and delivers its location signal to the timing function generator shown in FIG. 3.

The object to be explored by ultrasonic imaging, denoted by 27, which may be a portion of the human anatomy, contains an ultrasonic propagation medium, denoted by 15, in which there are ultrasonic reflecting bodies, a typical such reflecting body being denoted by 16. A layer of coupling liquid, denoted by 14, between the ultrasonic transducers and the object to be explored, couples the ultrasonic signals in the medium denoted by 15 to the transducers. A typical azimuthal minimum resolved width on the surface of the reflecting body is the reflecting element, denoted by 17, on the reflecting body. The diffracted wave from said minimum resolved width reflecting element, is defined by the limiting rays denoted by 20 and 21, between which the diffracted wave from said reflecting element is contained in the ultrasonic medium. The radiation transducer produces a collimated beam between the limiting illumination rays denoted by 22 and 23. The sensing transducer is sensitive to back-reflected signals within a cone angle defined by the limiting sensitive rays denoted by 18 and 19. In order to resolve the minimum resolution element denoted by 17, the sensitivity cone angle of the sensing transducer must be at least as large as the limiting diffraction cone angle defined by rays 20 and 21. The sensing transducer must move over the spread of this diffraction cone angle defined by limiting rays 20 and 21 to receive back-reflected signals over this spread in order to produce an image signal which will resolve the minimum element denoted by 17.

It will be understood that although FIG. 1 shows individual moveable tranducers for sensing and radiation, it is possible to operate this system in a number of other ways. For example, one can also utilize the sensing transducer as the radiation transducer, in which case only one moveable transducer would be used. In this case both the pulsing signal and the back-reflected signal would be conducted, at different times, into and from the lead wires 6 of sensing transducer 4, and components 3, 5, 7, 9, 12, 13 and 25 would be unnecessary. For such a single transducer embodiment the same limiting rays 18 and 19, which define the sensitivity cone angle of the sensing transducer, would define its radiation cone angle.

Figure 2:
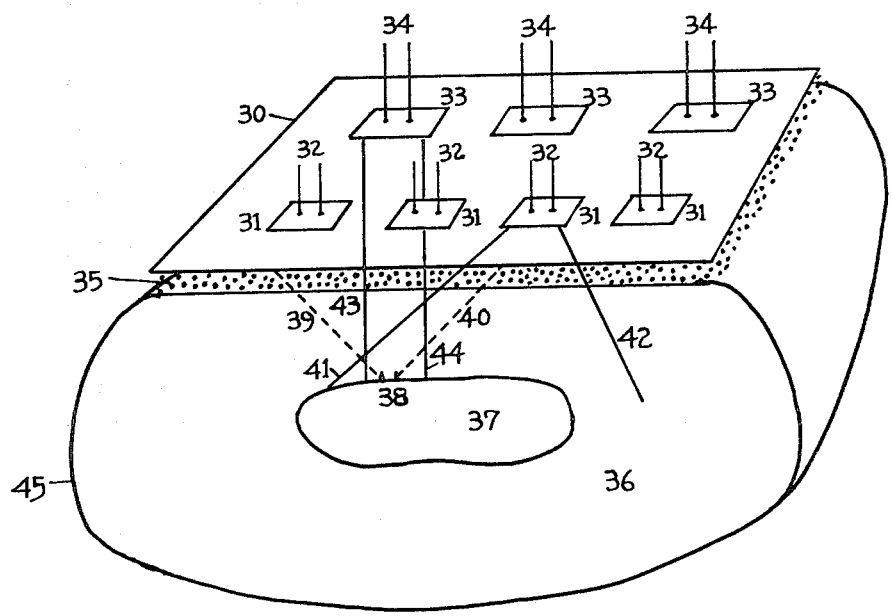

Another embodiment of this invention will use a single moveable transducer 4, as the sensing transducer as described above, but will use a fixed array of radiation transducers for ultrasonic illumination of the reflecting body. The fixed array of radiation transducers is shown in FIG. 2 and is described subsequently. It will be understood that the pulsing and multiplexing subsystem appropriate to the moveable transducer shown in FIG. 3 will be used when a moveable transducer is utilized, and that the pulsing and multiplexing subsystem appropriate to the fixed transducer array shown in FIG. 4 will be used when a fixed transducer array is utilized. An alternative embodiment of this invention will utilize a fixed transducer array of sensing transducers, and a single moveable radiation transducer.

Referring now to FIG. 2 which shows a perspective view of the fixed transducer array embodiment of the transducer subsystem of this invention, the components are as follows: An array support structure, denoted by 30, is shown on the surface of the object, denoted by 45, which is to be explored by ultrasonic imaging, which may be a portion of the human anatomy. The individual fixed transducers of the arrays are supported by the structure 30. Sensing transducers, denoted by 31 are mounted on this structure in array fashion, in contact with a layer of coupling fluid, denoted by 35, between the ultrasonic transducers and the object to be explored. Radiation transducers, denoted by 33, are also mounted in array fashion on the support structure 30. The sensing and radiation transducers are mounted in closely spaced planes. Electrical lead wires denoted by 32 emanate from each sensing transducer 31. The back-reflected signal output from the sensing transducer can be taken from the electrical leads 32 eminating from each transducer. Electrical lead wires denoted by 34 emanate from each irradiation transducer 33, through which a high frequency electrical pulse signal can be inputted to produce an ultrasonic pulse from each said irradiation transducer. The length of the transducer array defines the coherent aperture of the transducers.

The object to be explored, denoted 45, consists of an ultrasonic propagation medium, denoted by 36, and ultrasonic reflecting bodies, typically shown as a body denoted by 37. A typical minimum resolved width on the surface of the reflecting body is the reflecting element, denoted by 38 on the reflecting body. The diffracted wave from said minimum resolved width reflecting element, is defined by the limiting rays denoted by 39 and 40, between which the diffracted wave from said element is contained in the ultrasonic medium. Each radiation transducer of the array produces a collimated beam between limiting illumination rays typically shown for a single radiation transducer, and denoted by 43 and 44. The sensing transducers are each sensitive to back-reflected signals within a cone angle between limiting sensitive rays typically shown for a single sensing transducer and denoted by 41 and 42. In order to resolve the minimum resolution element denoted by 38, the sensitivity cone angle of each sensing transducer must be at least as large as the limiting diffraction cone angle defined by rays 39 and 40. All sensing transducers within the spread of this diffraction cone angle defined by limiting rays 39 and 40 must receive back-reflected signals from element 38 over this spread in order to produce an image signal which will resolve the minimum element denoted by 38.

It will be understood that although FIG. 2 shows individual fixed transducer arrays for sensing and radiation it is possible to operate this system in a number of other ways. For example, one can also utilize the sensing transducer array as the radiation transducer array in which case only one transducer array would be used. In this case both the pulsing signal and the back-reflected signal would be conducted, at different times, into and from the lead wires 32 of the sensing transducers 31 and the irradiation transducer array 33 would be unnecessary. For such a single fixed transducer array embodiment the same limiting rays 41 and 42, which define the sensitivity cone angle of the sensing transducer would define its radiation cone angle.

Other embodiments of this invention will use a single moveable transducer for the function of sensing but will use a fixed array of radiation transducers for ultrasonic illumination. The single moveable transducer with its structure is shown in FIG. 1. Another embodiment of this invention will use a single moveable transducer for irradiation in combination with a fixed sensing transducer array, as previously described. It will be understood that the pulsing and multiplexing subsystem appropriate to the moveable transducer shown in FIG. 3 will be used when a moveable transducer is utilized, and that the pulsing and multiplexing subsystem appropriate to the fixed transducer array shown in FIG. 4 will be used when a fixed transducer array is utilized.

Other alternative embodiments will utilize several moveable sensing transducers in combination with a fixed array of radiation transducers, or several moveable irradiation transducers in combination with a fixed array of sensing transducers. One can also use a combination of moveable and fixed sensing transducers to perform the sensing function, and a combination of moveable and fixed irradiation transducers to perform the ultrasonic irradiation function. It will thus be understood that the sensing and irradiation functions are separate and can each be performed by a variety of structures, since the coordination between them is electronic and is performed in the multiplexing and pulsing subsystems shown in FIGS. 3 and 4 with their associated electronic control units. It will therefore be understood that the programming and multiplexing of the electronic control units to be described subsequently will be adapted to the particular combination of transducer structures utilized.

Figure 3:
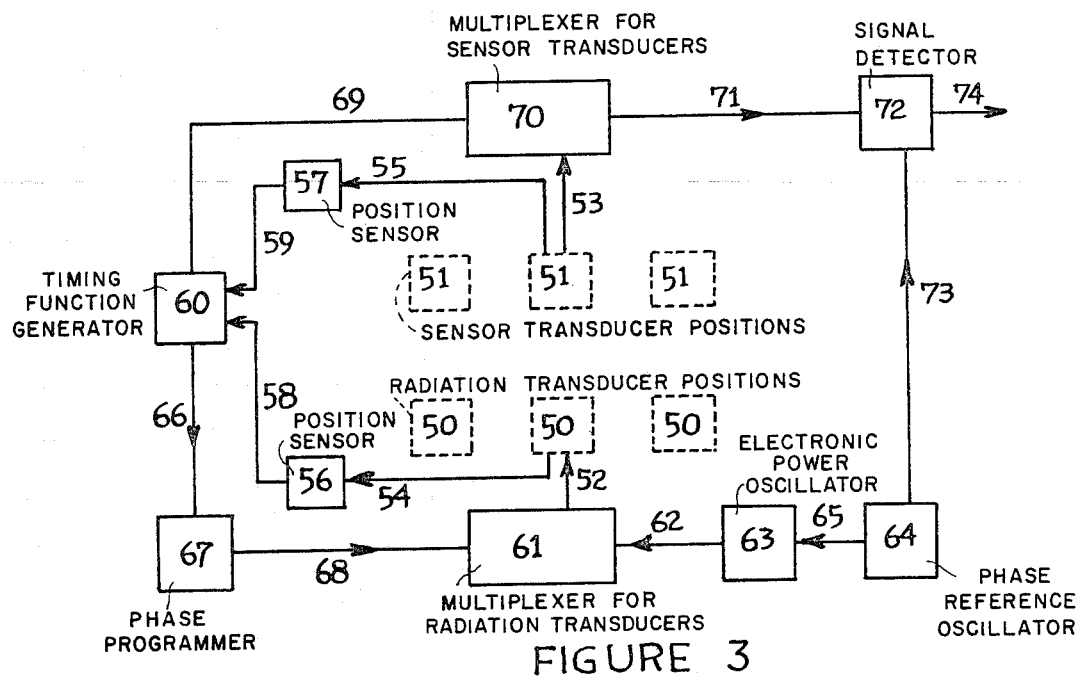
FIG. 3 shows by means of a schematic block diagram, the basic structural principles of the pulsing and multiplexing subsystem of this invention in an embodiment which utilizes a moving transducer traverse for the sensing and radiation transducers.

FIG. 3 shows a schematic block diagram of the pulsing, multiplexing, and electronic control subsystem of this invention for moveable transducer structures. The embodiment shown refers to a structure with a single moveable radiation transducer, moveable to a sequence of positions at which it is pulsed; and also with a single moveable sensing transducer, moveable to a sequence of positions at which the back-reflected signal is read out. It will be understood, however, that the principles shown apply to embodiments in which only one moveable transducer is used, or wherein a number of such transducers are used.

Referring to FIG. 3 the sequence of positions at which the single moveable radiation transducer is pulsed is shown by the sequence of broken line boxes denoted by 50. The sequence of positions at which the back-reflected signal is read out from the single moveable sensing transducer is shown by the sequence of broken line boxes denoted by 51. The electrical input leads to the single moveable radiation transducer for ultrasonic pulse power input are denoted by 52 and shown at a typical pulsing position. The electrical output leads from the single moveable sensing transducer, for readout of the back-reflected signal time function from it, are denoted by 53 and shown at a typical readout position. The electrical input leads 52 to the radiation transducer emanate from the electronic switch or multiplexer, denoted by 61, which initiates and terminates the ultrasonic pulse power to the transducer, thus acting as the pulse timer and pulse former. The electrical output leads 53 from the sensing transducer lead into the electronic switch or multiplexer, denoted by 70, which initiates and terminates the sensing transducer, thus acting as the sensing signal selector and timer.

The radiation transducer position sensor, denoted by 56, reads a mechanical coupling denoted by 54, to the transducer location, producing a radiation transducer position signal, denoted by 58. The sensing transducer position sensor, denoted by 57, reads a mechanical coupling, denoted by 55, to the transducer location, producing a sensing transducer position signal, denoted by 59. The radiation transducer position sensor, 56, performs the function of the sensor denoted by 13 in FIG. 1 and the sensing transducer position sensor, 57, performs the function of the sensor denoted by 11 in FIG. 1. The radiation transducer position signal, 58, and the sensing transducer position signal 59, each flow into the timing function generator, denoted by 60. This timing function generator is programmed to produce timing signals for initiation of an ultrasonic pulse by the radiation transducer, and to produce timing signals for sensing of a back-reflected signal time function from the sensing transducer, in accordance with the position signals from each transducer, as controlled by a predetermined timing signal program. The timing signal for ultrasonic pulse initiation, denoted by 66, flows to a programmer for phase adjustment, denoted by 67, which selects the initiation phase for each pulse in accordance with a predetermined program. This phase adjustment programmer is not used when a sequence of phased pulses is not required, i.e., when all pulses are initiated at the same phase value. Physically, the phase adjustment programmer may be a variably programmed time delay element.

The phase programmed pulse initiation signal, denoted by 68, flows to the electronic switch or multiplexer 61 where it initiates a coherent pulse signal with correct phase for application through electrical leads 52 to the radiation transducer 50 at its selected position in the sequence of pulses.

The timing function generator 60 also produces timing signals, denoted by 69, for the sensing multiplexer or electronic switch 70, which initiates and terminates the readout of the back-reflected signal time function from the leads 53 of the sensing transducer 51 at its selected position in the sequence. This selected position and its precise readout time are specified by the timing signals 69 into the sensing multiplexer.

The set of back-reflected time signal functions read out from the sensing multiplexer 70 comprises a sequential train of back-reflected signal time functions denoted by 71, which is inputted to the detector, denoted by 72. The output of the detector denoted by 74 is then available for convolution processing. The detector 72 and processor are shown in detail in FIG. 5 which will be described below. It should be pointed out that the detector is of a special type for coherent detection, and that some types of coherent detectors require a coherent reference signal, denoted by 73, as an input.

It will be understood that both the ultrasonic pulsing and the detection of the sensed back-reflected signals are phase coherent. A phase coherent pulsing system requires a phase coherent electronic source oscillator to produce the electrical oscillations at the ultrasonic frequency for application to the radiation transducer leads 52 through the multiplexer 61. For this purpose a phase coherent electronic source oscillator, denoted by 63 is provided, whose phase coherent electronic power output, denoted by 62, is fed into the multiplexer 61. In order to maintain the frequency stability and the phase coherence of the source oscillator 63, an external reference oscillator, denoted by 64 can be used, whose output, denoted by 65, is utilized by the source oscillator 63 to maintain its phase stability by comparison of its output signal 62 with the reference signal 65. The output of the reference oscillator, denoted by 73, may also be utilized in the detector 72 to perform coherent detection. However, this is not necessary in all phase coherent detectors.

It will be understood that in an embodiment which employs a single moveable transducer as both a sensing transducer and as a radiation transducer, the electrical leads 52 and 53 emanate from this single transducer, but both sets of electrical connections are necessary. In this case it is necessary that the sensing multiplexer 70 shall not pass the pulsing signal applied to the transducer. It will also be understood that only one position sensor is necessary. Thus either 55, 57, 59 or 54, 56, 58, may be omitted. Otherwise the subsystem of FIG. 3 applies directly.

It will be understood that when several sensing transducers are used, there will be a set of components 53, 55, 57, 59 for each one. Similarly with regard to several radiation transducers there will be a set of components 52, 54, 56, 58 for each one. The timing function generator will be programmed to distribute timing signals through the multiplexers to the appropriate sequence of transducers in each case.

Figure 4:
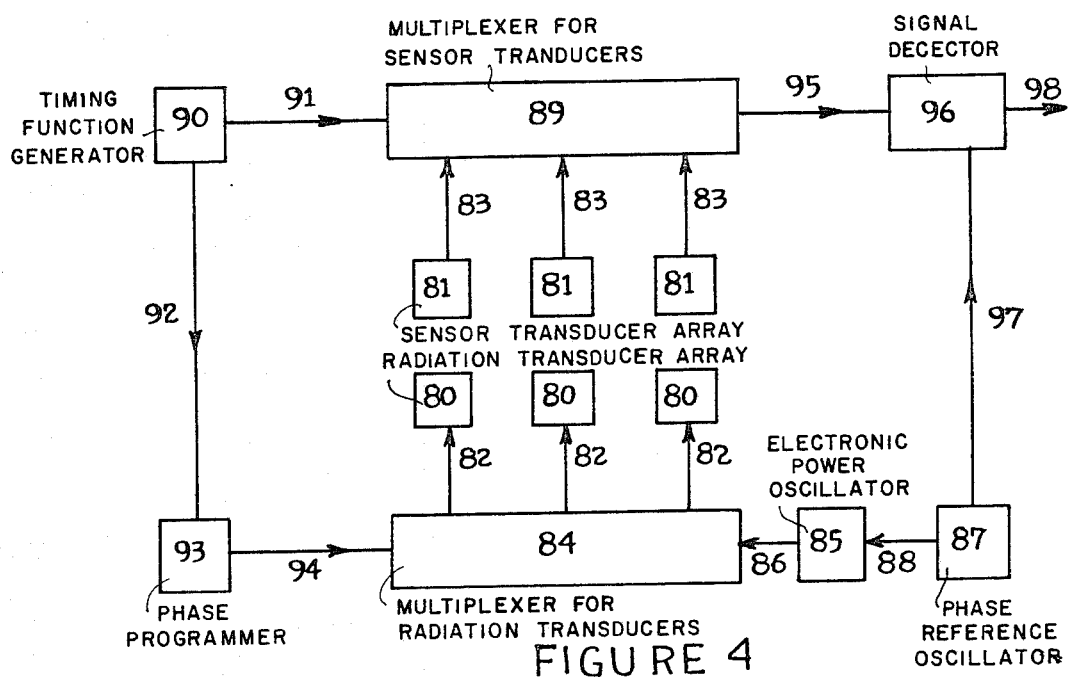
FIG. 4 shows by means of a schematic block diagram, the basic structural principles of the pulsing and multiplexing subsystem of this invention in an embodiment which utilizes transducer arrays for the sensing and radiation transducers.

FIG. 4 shows a schematic block diagram of the pulsing, multiplexing and electronic control subsystem of this invention for fixed transducer array structures. The embodiment shown refers to a structure with a fixed array of radiation transducers and with a fixed array of sensing transducers. It will be understood, however, that the principles shown apply to embodiments in which only one fixed array is used, or wherein a combination of fixed array transducers and moveable transducers is utilized.

Referring to FIG. 4, the fixed array of radiation transducers, denoted by 80, each have electrical input leads, denoted by 82, for input of ultrasonic pulse power into the individual transducers. These input leads 82 emanate from the pulsing multiplexer, denoted by 84, which initiates and terminates the ultrasonic pulse power to the transducers and distributes the pulse power to the individual transducers, in accordance with timing signals denoted by 94. Thus the multiplexer 84 acts as a pulse distributor as well as a pulse timer and pulse former. The fixed array of sensing transducers, denoted by 81, each have electrical output leads, denoted by 83, for output of the back-reflected signal time functions sensed by each transducer to the sensing multiplexer, denoted by 89. The sensing multiplexer selects the sequence of back reflected signal time functions sensed by the individual sensing transducers in accordance with timing signals from the timing function generator, denoted by 90.

The timing function generator, 90, is programmed to produce coded timing signals for sensing the back-reflected signals emenating from the electrical outputs 83 of the sensing transducers. Both the timing for selection of these sensed signals and the sequence of selection among the individual sensing transducer outputs are determined by the sensing multiplexer by means of the coded timing signals, denoted by 91, produced by the timing function generator and inputted into the multiplexer 89. The timing function generator is programmed to produce appropriate coded time signals for this purpose according to a predetermined timing signal program. The timing function generator is also programmed to produce timing signals for initiation of ultrasonic pulses by the radiation transducer array. These signals are coded to select the sequence of individual transducer array elements which are to be pulsed. These timing signals for ultrasonic pulse initiation, denoted by 92, flow to a programmer for phase adjustment, denoted by 93, which selects the initiation phase for each pulse in accordance with a predetermined program. This phase adjustment programmer is not used when a sequence of phased pulses is not required, i.e., when all pulses are initiated at the same phase value. Physically, the phase adjustment programmer may be a variably programmed time delay element.

The phase programmed pulse initiation signal, denoted by 94, flows to the multiplexer 84 where it initiates a coherent pulse signal with correct phase for application through electrical leads 82 to the radiation transducer selected by the multiplexer in accordance with a code in the pulse initiation signal. Thus the desired sequence of pulse initiations in the radiation transducer array is obtained.

The set of back-reflected time signal functions read out from the sensing transducer leads, 83, through the sensing multiplexer, 89, comprises a sequential train of back-reflected signal time functions, denoted by 95, which is inputted into the detector, denoted by 96. The output of the detector, denoted by 98 is then available for convolution processing. The detector, 96, and processor are shown in detail in FIG. 5 which will be described below. It should be pointed out that the detector is of a special type for coherent detection and that some types of coherent detectors require a coherent reference signal, denoted by 97, as an input.

It will be understood that both the ultrasonic pulsing and the detection of the sensed back-refelcted signals are phase coherent. A phase coherent pulsing system requires a phase coherent electronic source oscillator to produce the electrical oscillations at the ultrasonic frequency for application to the radiation transducer leads 82 through the multiplexer 84. For this purpose a phase coherent electronic source oscillator, denoted by 85 is provided, whose phase coherent electronic power output, denoted by 86, is fed into the multiplexer 84. In order to maintain the frequency stability and the phase coherence of the source oscillator 85, an external reference oscillator, denoted by 87, can be used. Its output, denoted by 88, is utilized by the source oscillator 85 to maintain its phase stability by comparison of its output signal 86 with the reference signal, 88. The output of the reference oscillator, denoted by 97, may also be utilized in the detector 96 to perform the coherent detection. However, this is not necessary in all phase coherent detectors.

It will be understood that in an embodiment which employs a single fixed array of transducers for sensing and radiation, the electrical leads 82 and 83 emanate from the transducers of this single array, but both sets of electrical connections are necessary. In this case it is necessary that the sensing multiplexer 89 shall not pass the pulsing signal applied to the transducers.

It will be understood that other embodiments of this invention will combine a fixed array of sensing transducers with moveable radiation transducers; other embodiments will combine a fixed array of radiation transducers with moveable sensing transducers. For such embodiments it will be understood that the pulsing and multiplexing subsystem will combine the appropriate features of FIGS. 3 and 4 in accordance with the principles described.

Figure 5:
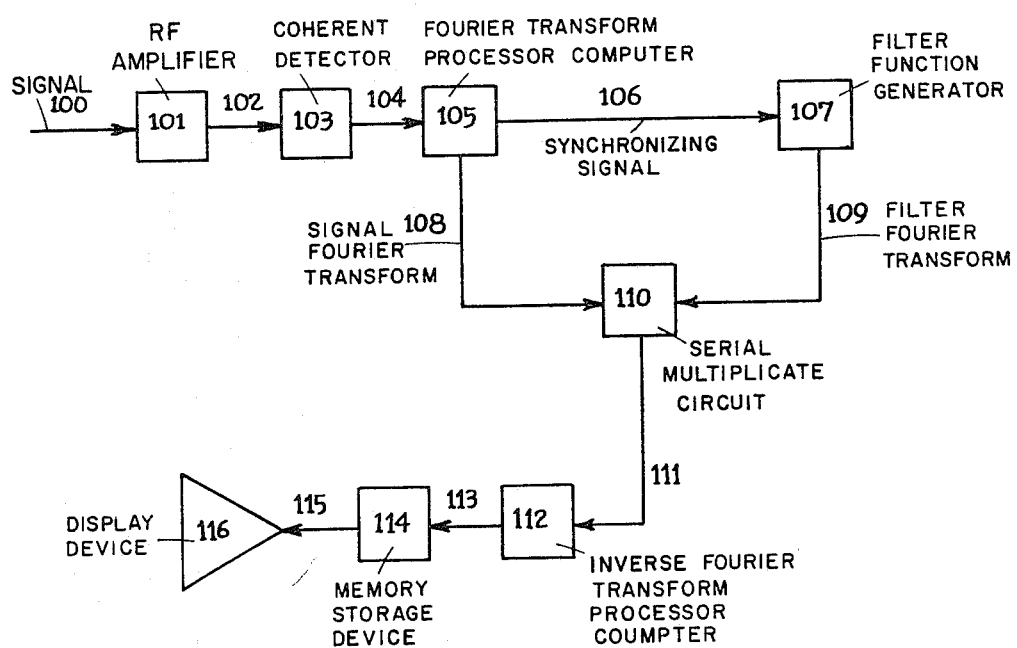
FIG. 5 shows, by means of a schematic block diagram, the basic structural principles of the signal processing and image signal extraction section of this invention.

FIG. 5 shows a schematic block diagram of the signal processing and image signal extraction subsystem of the present invention in an embodiment in which the convolution processing is performed by fourier transform methods utilizing digital computer devices programmed according to the FFT (fast fourier transform) algorithm. The FFT method is a well known means of producing a fourier transform of an input signal rapidly in real time. In this embodiment of the invention the convolution processing is performed by digital computation methods, whose mathematical basis will be subsequently described. While a number of other embodiments of the image signal extraction subsystem can be used, as described subsequently in this specification, this embodiment is typical in schematic form of the signal processing principles which characterize other electrical and optical processing embodiments.

Referring to FIG. 5, the input signal to the processor is the back-reflected signal train time function, denoted by 100, which is selected from the sensing transducer outputs by the sensing multiplexer, as shown in FIGS. 3 or 4. The input signal 100 in FIG. 5 is the output of the sensing multiplexer shown in FIGS. 3 or 4. This input signal enters a radio frequency amplifier, denoted by 101, which may utilize range variable gain or sensitivity time control, or which may be a logarithmic amplifier, to compensate for increased attenuation with range in the ultrasonic propagation medium, as will be described subsequently. The amplified radio frequency signal which may include this range variable gain, denoted by 102, is inputted to a coherent detector, denoted by 103. The function of the coherent detector is to eliminate the high frequency ultrasonic carrier wave while preserving both the amplitude and phase of the image signal information content of the input signal. This is done by translating the information content of the signal to a low frequency band. A number of coherent detectors have been developed to perform this function while preserving the phase coherent character of the signal. Among these coherent detector types are the synchronous detector, the phase locked detector, and the phase coherent detector, which will be subsequently described. Some coherent detector types utilize the ultrasonic reference oscillator signal at this point, as described in connection with FIGS. 3 and 4. The detected signal train, denoted by 104, is the input to the coherent processor, which comprises elements 105 to 115 of the schematic diagram of FIG. 5. It will be realized that this diagram shows a typical embodiment of a convolution processor, but that other embodiments which are similar in function can be utilized.

A fourier transform processor, denoted by 105, produces a fourier transform of the detected input signal 104. The fourier transform processor will be a digital computer adapted to implement the fast fourier transform algorithm. A data compression memory unit may be incorporated into the fourier transform processor to speed up the processing. If one designates the input signal 104 by the time function notation $f(t)$, where $t$ denotes time, then the output signal, denoted by 108, of the fourier transform processor, will be the fourier transform of $f(t)$, which can be denoted by $\bar{f}(w)$, where $w$ is the frequency and the overhead bar denotes the fourier transform. As the fourier transform is outputted, as output 108, frequency value by frequency value in serial fashion, a corresponding fourier transform denoted $\bar{K}(w)$ is outputted on an output line denoted by 109. $\bar{K}(w)$ is the fourier transform of the inverse filter function, to be described subsequently. This inverse filter function fourier transform is produced by an electronic filter function generator denoted by 107, which has an internally stored program to produce the unique inverse filter function fourier transform $\bar{K}(w)$ characterising ultrasonic propagation and reflection in the ultrasonic medium under exploration. The output of the inverse filter function fourier transform on output line 109 is synchronously coordinated with the output of the fourier transform $\bar{f}(w)$ on output line 108 by synchronizing signals, denoted by 106, from the fourier processor 105 to the filter function generator 107. The two fourier transforms $\bar{f}(w)$ of the detected signal function, and $\bar{K}(w)$ of the inverse filter function, thus enter a serial multiplication circuit, designated 110, in synchronism. The serial multiplication circuit multiplies these transforms point by point in the frequency domain to produce a serial output, denoted by 111, which is the product of $\bar{f}(w)$ and $\bar{K}(w)$. This product fourier transform can be designated $\bar{Z}(w)$ where $\bar{Z}(w) = \bar{f}(w) \cdot \bar{K}(w)$. The output $\bar{Z}(w)$, denoted by the output line 111, is the fourier transform of the high resolution processed image signal, which can be designated $Z(t)$. The process of calculating $\bar{Z}(w)$ from $\bar{f}(w)$ and $\bar{K}(w)$ and subsequently inverting this transform to produce $Z(t)$ is called convolution processing.

This processing is completed by a fourier transform processor, designated by 112, which accepts as input the fourier transform $\bar{Z}(w)$ on the output line 111, and inverts this transform to produce $Z(t)$, the high resolution processed image signal. The fourier transform inversion device 112 is also a digital computer adapted to perform the fast fourier transform algorithm for inversion of a transform. The output of 112 is denoted by 113, which is $Z(t)$, the high resolution processed image signal, in time serial form. This image signal may then be stored in a memory storage device, denoted by 114, if desired. The stored signal $Z(t)$ may then be outputted at any time on an output line, denoted by 115, for display on a display device, denoted by 116, which may be a cathode ray tube.

While the previous description of this invention and some of its typical embodiments as set forth in the figures, describe its basic structure, it will be advantageous in the interests of complete disclosure to set forth in greater detail the structure and technology which will be used in the various applications of this invention.

The present invention can utilize two distinct methods for setting up the series of transducer replication positions from which the ultrasonic pulses are emitted and at which the back-reflected pulses are sensed. The first may be termed a moving transducer pulsing structure, and the second may be termed a transducer array pulsing structure. In the moving transducer pulsing structure at least one transducer is mechanically moved to a sequence of positions along the surface of the ultrasonic propagation medium. A variety of mechanical means can be used to guide the movement of the ultrasonic transducer. (1) A set of rigid guide rods can be used, on which the transducer can slide or roll. (2) Another method makes use of flexible rods or tubes in which the transducer can slide or roll. (3) Another method will make use of a set of hinged arms attached to the transducer, whose method of hinging and pivoting is such as to maintain the traversal of the transducer in a desired course, according to well known techniques. Many similar mechanisms can also be used. Each of these methods can use a motorized drive to move the transducer. The drive mechanism can be any of a number of well known means including drive rods, screws, chain drives, belts, gears, worm gears, ratchet and pinion mechanisms, etc., attached to the motor mechanism and to the transducer mounting.

It is necessary to provide a position sensing mechanism to give information on the transducer location to the electronic switching circuits for pulsing the transducer. This will assure that the pulses are generated at the predetermined positions of the transducers. A variety of position sensors is available, based on the extension of the drive mechanism, or on its instantaneous configuration, or on an integrating tachometer or on optical or electrical resistive sensors, or on many other well known means.

It should be pointed out that the transducer can also be manually positioned and traversed so long as its precise position is sensed to coordinate the pulse generation and/or the pulse sensing with the transducer position. The pulse initiation may also take place by manual command so long as the correlation between pulse time and transducer position is maintained.

The second method for setting up the required series of replicated transducer positions from which the ultrasonic pulses are emitted or at which the back-reflected pulses are sensed is to utilize an array of individual transducers at fixed positions within a one or two dimensional gridwork of positions. It will be pointed out below that two dimension and even three dimensional sets of transducer positions can often give useful scanning patterns, whether with the array structure or by the moving transducer structure.

The individual transducers are mounted in a rigid mechanical framework, or within a flexible framework for fitting the array to an irregular contour. Electrical contact leads from the individual transducers are connected to electronic switching circuits or multiplexers for use in pulsing the individual transducers, and in detecting the back-reflected signals to the individual transducers, as described below.

The transducer array structure has the advantage of not requiring any motion of the transducers. The energizing high frequency voltage is switched to the individual transducers of the array by the electronic switching multiplexer circuits to produce the desired succession of phase coherent pulses in the predetermined sequence of positions of the transducers of the array. The scanning process can take place more rapidly and with greater control when such an array of transducers is used since there is no necessity for mechanical motion. The spacing of the transducers and the number of transducers in the array are governed by well known considerations on coherent phased arrays of microwaves and optical radiators, which are analogous to ultrasonic transducers in their geometrical phase characteristics. These will be subsequently described.

The use of electronic switching and multiplexing circuits for applying the electrical pulse energization to the individual transducers of the array, or to the individual transducer positions in the moving transducer method, are well known in electronic technology, and are described in many books and articles on analog and digital electronic techniques. The use of a phase stabilized electronic oscillator source, which has been referred to above as the means for obtaining the desired phase coherence, is also well known. The use of electronic switching and multiplexing circuits for collecting the appropriate sequence of back-reflected detected signals from the individual transducers of the array, or from the individual transducer positions in the moving transducer method, is also a direct application of well known multiplexing technology.

An electronic switching system or multiplexer is used to sum the back-reflected signals from the successive pulses of the successive transducer positions. These individual back-reflected signals are received, amplified and detected with their detailed time-dependence and their detailed frequency dependence which are preserved by the detection process described above. The successive back-reflected signals contain all the amplitude data, spatial frequency data, and the phase data of the reflecting body image. This information content of the back-reflected signal will be described below.

The multiplexing system consists of two parts. One section selects the transducer positions (in the moving transducer embodiment of this invention) at which an ultrasonic pulse is to be produced; it also selects the initiation time of the pulse, and thus the initial phase value of the ultrasonic oscillation in the pulse. In the transducer array embodiment of this invention it selects the transducer array element for each pulse and the time for initiation of the pulse, and thus the initial phase value of the pulse. Since the pulses are produced by a phase coherent source oscillator for the relative phases of the oscillation are preserved throughout the ultrasonic pulse, which may typically consist of only a few oscillations, since a narrow pulse leads to high range resolution.

The other section of the multiplexing system selects the transducer position from which the back-reflected pulse will be taken and channelled to the detection circuits. Each sensing transducer converts the ultrasonic back-reflected waves into corresponding electrical signals which can be channelled to the detection circuits. In the non-uniform phase scanning method, described below, the transducer from which this signal is taken to the detector is usually the same transducer from which the pulse originated. However it is sometimes useful to select another transducer location to sense the back-reflected signal.

The technology of multiplexers is well known. A multiplexer consists of a set of electronic gates with electronic logical circuitry for either (a) selection of the output from one of a number of information channels (in the sensing multiplexer) or (2) for distributing an incoming signal into one of a number of output channels (in the pulsing multiplexer) according to a preprogrammed signal generator. It is necessary to have a programmed signal generator for instructing both the pulsing multiplexer and the sensing multiplexer. In the moving transducer version of this invention, the programmed signal generator usually requires an input on the location of the moving transducer before it will instruct the multiplexer to pulse the transducer. It may also have a phase-program generator to select the initiation time for the pulse in order to produce the desired initial phase. For example, one may wish to produce a set of pulses corresponding to a monodirectional beam from the transducer positions. In this case the selected phase value $\phi_n$ for the n-th transducer position is $$\phi_n = (2\pi/\lambda) X_n \sin\theta$$

where $x_n$ is the position of the $n$-th transducer from the origin. When the initial phases for the pulses are selected in this way, proportional to the distance along the array from the origin, they correspond to the ultrasonic radiation contributions from a phased array and produce a monodirectional beam. One example is that of equally spaced transducer positions. In this case $x_n = ns$, where $s$ is the spacing of trans-ducer positions. Thus $\phi_n = \phi_o$ where $$\phi_o = (2\pi/\lambda) s \cdot \sin\theta$$

Selection of the $\theta$ value determines the direction of the monodirectional beam. This method applies to both the moving transducer version of the invention and to the transducer array version.

It is sometimes useful to scan the reflecting body with a number of monodirectional beams pointing in various directions. This may increase the total back-reflected signal when the reflection varies markedly with the direction of the incoming beam, due to the specular character of the reflection from the surface. In this case a portion of the surface which does not reflect appreciably for one beam direction may contribute a large reflection for another beam direction. However it should be pointd out that the use of a wide beam from a transducer with large angular beamwidth will also give an appreciable reflection without using monodirectional beams in a variety of directions.

It will be understood that an ultrasonic source oscillator is used to produce the electrical pulses that actuate the transducer or transducers. This source oscillator must produce sufficient power for each pulse. It must also maintain both frequency and phase stability. This can be ensured by using a reference ultrasonic oscillator to regulate the source oscillator. The technology of using reference oscillators to regulate and stabilize a constant frequency phase stable oscillator is well known.

It will be understood that the sensing multiplexer will usually combine the back-reflected signals to the detector into a single sequence train of signals to characterise the reflecting body surface. This is done by simply sequencing the back-reflected pulse time pattern signals serially in time on a single information channel into the detector. The detector output will then be a train of detected pulse returns, each pulse return being a signal time function corresponding to the reflecting body return for that pulse.

The procedure described above requires a signal time generator for selecting the pulse times, the transducers to be pulsed, the initiation phase of each time. Such an electronic function generators are well known and extensively used in computer information processing applications. They may consist, for example, of one or more signal oscillators (clocks) plus a series of logical circuits for selection of times voltage levels, phases, etc.

The detection process consists of separating the information concerning the reflecting body from the ultrasonic carrier wave. This must be done without destroying the phase information in the signal, since the phase information permits coherent summation of the back-reflected pulses from the various transducer positions.

The back-reflected signal is first sensed by the designated transducer. This sensing transducer produces an electronic signal with the amplitude and phase of the ultrasonic signal. This signal can be amplified by a radio frequency amplifying stage. Sensitivity time control can be used to give a gain that varies with range through the pulse, thus compensating for attenuation with range. It is the use of a small diameter sensing transducer without sidelobes that makes possible gain variation with range in the amplification process, without spurious sidelobe effects.

The essential feature of the detection process is the extraction of the reflecting body information from the ultrasonic carrier wave. This is done by translating the center frequency from the ultrasonic range to a convenient low frequency. However it will be realized that the information includes phase as well as amplitude vs time, for it is only the phase information which permits the high resolution required. It is necessary to perform detection without altering the phase information in the signal.

There is a well known technology for performing detection without destroying phase information. This is summarized by Skolnik in "Radar Systems" (McGraw-Hill) pp. 437–439 in which he describes three methods for detection without phase information loss. These are:

1. The coherent detector, in which a reference oscillator of the same frequency and phase as the signal carrier is added to the signal in a "balanced mixer" and the mixer output is passed through a low-pass filter. The coherent detector provides a translation of the carrier frequency to DC. It is a linear detector and does not extract the amplitude (modulation envelope) alone but preserves the phase, as well as all the signal frequencies. A somewhat related detection method is the cross-correlation detector.
2. The synchronous detector is similar to the coherent detector except that the phase of the reference signal is synchronized to the incoming signal by some automatic means. Synchronization may be done by injecting some of the input voltage into the reference oscillator circuit.
3. The phase-locked detector uses a servo-controlled loop to maintain the phase of the voltage-controlled reference oscillator in step with the phase of the incoming signal. This leads to the phase-lock circuit which is the basis of the Microlock system used for passive satellite tracking. Because the bandwidth of the phase tracking loop need only be large enough to pass the difference between the signal frequency and the frequency of the voltage controlled oscillator, the noise amplitude in the feedback loop is much smaller than in a comparable non-tracking filter which must accept all possible variations in the signal frequency. Therefore the phase-locked detector is very sensitive.

There are therefore a number of methods for detection which preserve the signal phase, and their technology is well known and well developed.

One category of scanning methods for practicing the present invention utilizes a radiation transducer with an ultrasonic beam of large angular width. A pulse from such a transducer reaches a wide surface extent of a reflecting body. The distances from the transducer to the various "illuminated" points on the reflecting body are widely different. For this reason the phase of the incident wave on the reflecting body from such a transducer varies from point to point. This type of scanning can therefore be called non-uniform phase scanning. It differs from the scanning method to be described subsequently in which a narrow-angled ultrasonic beam is used, for producing the pulse. This is effectively a collimated beam, corresponding to a plane wavefront uniform phase in the collimation area. This type of uniform phase scanning will be described subsequently.

Non-uniform phase scanning can be performed, for example, with a single transducer of wide angular beam width used both as the radiation transducer and as the sensing transducer. The transducer can be placed at a sequence of positions along its traverse if it is moveable. At each position the transducer is pulsed and the reflected pulse is detected at the same transducer location. Thus the scanning consists of a two way propagation from the transducer to the reflecting body and back to the same transducer. The pulse is emitted by the transducer over a wide angular cone; it is then reflected back and sensed by the same transducer. Since the pulse is reflected from a wide distribution of points on the reflecting body, a large range or return times is included in such a reflection. Since the pulse is emitted over a wide range of angles one has a considerable range of incidence angles on the reflecting body. Thus if the surface tends to reflect only at certain angles of incidence, it is quite likely that if a pulse from one transducer position does not receive the pulse at a high reflection angle, a pulse from another transducer position will receive it.

Non-uniform phase scanning from a succession of transducer positions can also be performed with a transducer array in which each transducer is pulsed in succession. A sequence of back-reflection pulses, one following the next in serial order, is obtained. The outputs of the successive transducers used as sensors can be connected to a common electrical line to give a series of pulse returns whose time order indicates the order in which the transducers are pulsed. When a moving transducer is used the same serial order of pulse returns can be obtained. The time position of the pulse in the pulse train sequence therefore identifies the transducer position from which the pulse was emitted or collected.

The non-uniform phase scanning method can also be practiced using different transducers for radiating the pulse and for sensing the backreflected pulse.

The procedure described previously includes the following steps:

1. Programmed pulsing of the individual transducers of the array, or of moving transducers traversing a sequence of positions. The use of a phase coherent source oscillator for these pulses, with programmed multiplexed selection of the initiation time for each pulse, produces phase coherence of the individual pulses according to a predetermined phase pattern.

2. Multiplexed electronic switching of the back-reflected pulses which are sensed by the individual transducers of the array, or by a transducer moving along a sequence of positions in its traverse, into a single detector channel. The electronic switching for selection of the times and sequence of transducer outputs for switching to the detector channel are programmed by the time function generator to accord with the pulsing sequence which is used. The individual pulse returns selected by the multiplexer are routed into a single detector channel, thus combining the sequence of pulses into a serial time signal of back-reflected pulse returns.

3. Coherent detection of this serial sequence of back-reflected pulse return signals, in which the frequency bandwidth of the entire signal train is translated to low frequencies near DC without losing amplitude, frequency distribution, or phase relationship of the signal train.

The coherent back-reflected signal train produced by this procedure can be described by the following equations:

$$q(t) = \sum_n g_n(t) \tag{1}$$

$$g_n(t) = g_n(vt) = g_n(x) \tag{2}$$

$$g_n(x) = \int_{x-u_{\min}}^{x+u_{\max}} f(u) A\left(\frac{x-u}{R}\right) W(x-u) du \tag{3}$$

The symbols will be defined in the course of the following discussion: The first equation expresses the total detected signal train designated $g(t)$ as the sum of the detected signal trains $g_n(t)$ for each of the $n$ traverses of the transducer array or of the set of transducer positions. The second equation expresses $g_n(t)$ for the n-th traverse as a function of the azimuthal position $x=vt$ of the pulsing transducer. $v$ is the speed of movement of the transducer across its traverses, in the version of the invention in which moving transducers are used. In the transducer array version of the invention $v$ is the spatial rate at which the multiplexers switch from one transducer to the adjoining transducer. Note that there is a one-to-one relation between $x$, the position of the pulsing transducer, and the time $t$, given in this simple case by $x=vt$ in a single traverse. If $t$ is defined as a continuous variable for all traverses, one can define $x_n$ in the $n$-th traverse as $$x_n = vt - (n-i)L \qquad (4)$$

where $L$ is the length of the traverse.

The third equation is the most basic. It relates the coherent detected signal $g_n(x)$ at transducer position $x$ in the $n$-th traverse, to the reflection amplitude $f(u)$ of the reflecting body. The variable $u$ is the azimuthal coordinate across the reflecting body. $A[(x-u)/R]$ is the transducer angular beam pattern in which the ratio of $x-u$ to the range R is the angle between a reflecting position $u$ and the transducer. $W(x-u)$ is the reflecting point return from $u$ to the transducer at $x$ through the propagation medium. The integral in Equation 3 states that the returned signal at $x$, $g_n(x)$ is the sum of coherent contributions from all reflecting points on the reflecting body that are between the limits $x+u_{max}$ and $x-u_{min}$, where $u_{max}$ and $u_{min}$ are the extreme values of $u$ which can contribute at position $x$. $u_{max}$ and $u_{min}$ will depend on the transducer angular beam pattern $A[(x-u)/R]$.

Two important points concerning Equation 3 should be noted. First that it is a linear equation in the scattering amplitude $f(u)$ and the signal amplitude $g_n(x)$. This is due to the coherent nature of the scanning and detection process which is being used. It is the linear nature of the equation that makes possible the coherent processing described below. Second, that this equation has the convolution form in which $f(u)$ is multiplied by a function of $x-u$ in the integral. This is important because it permits one to interpret $A[(x-u)/R] W(x-u)$ as a filter function, which greatly facilitates the processing. This will be described in detail below.

The objective of this invention is to determine the reflecting body scattering amplitude $f(u)$ with high resolution. The linear form of Equation 3 denoting coherent summation to all points in the transducer array, gives the high resolution in $f(u)$. Solving Equation 3 for $f(u)$ one obtains $$f(u) = \int_{u-x_{min}}^{u+x_{max}} g(x)k(x-u)dx \qquad (5a)$$

or $$f(u) = \int_{-x_{min}}^{x_{max}} g(u+x)k(x)dx \qquad (5b)$$

$x_{max}$ and $x_{min}$ are the upper and lower limits of $x$ values which can contribute to $f(u)$, determined by the transducer beam pattern. These are equivalent alternate forms of the equation for $f(u)$, $K(x)$ is a filter function which is the mathematical inverse to the filter function $A(x/R) W(x)$ appearing in Equation 3.

It is the fact that $f(u)$ is determined by phase coherent contributions from a range of $x$ values from $x_{min}$ to $x_{max}$ which leads to higher resolution in $f(u)$. This large range of $x$ values is due to the wide beam pattern of the transducer. One can show that in order to resolve two points a distance $\Delta u$ apart the transducer must have an angular beamwidth $\Delta \theta$ given by $$\sin \Delta\theta \geq 0.61 \ \lambda/\Delta u$$

by Rayleighs resolution criterion or by $$\sin \Delta\theta \geq 0.31 \ \lambda/\Delta u$$

by any resolution criterion. Since the angular beamwidth of a transducer is approximately $\sin \Delta\theta = \lambda/d_r$ where $d$ is its diameter, this is equivalent to saying that the transducer diameter is approximately equal to the minimum obtainable resolution.

One can derive the required angular beamwidth of the transducer as follows. Suppose that a minimum azimuthal resolution $\Delta u$ is specified. The angular width of the beam radiating from it is the minimum resolution angle $\sin \Delta\theta = 0.61 \ \lambda/\Delta u$ by Rayleighs criterion or by $\sin \Delta\theta = 0.31 \ \lambda/\Delta u$ by any other criterion. The minimum $x$ aperture needed to resolve this beam is $$2x_m = R \sin \Delta\theta = 0.61 \ (\lambda/\Delta u) \ R$$

But this radiated beam must be received by the transducer pattern over a distance $2 \ x_m$. The transducer angular beamwidth $\Delta\theta$ must therefore be $$\sin \Delta\theta = 2x_m/R = 0.61 \ (\lambda/\Delta u) \text{ or } 0.31 \ \lambda/\Delta u$$

Therefore the minimum angular beamwidth of the transducer must be equal to arc $\sin 0.31 \ (\lambda/\Delta u)$ for the specified minimum resolution $\Delta u$.

Note that the condition $\sin \Delta\theta \geq 0.31 \ \lambda/\Delta u$ for the transducer angular beamwidth is not a sufficient condition for high resolution. One must also have coherent scanning and processing. If the processing were incoherent then the greater angular beamwidth would not lead to good resolution.

Although the theory and application of mathematical inverse operations is well known it will be instructive to show its application here. One can show the relation of the inverse filter $K(x-u)$ of Equation 5a to the filter function $$G(x-u) = A [(x-u) /R] W(x-u)$$

of Equation 3 as follows. If one writes Equation 3 as $$g(x) = \int f(u) \ G(x-u) \ du \qquad (3)$$

and multiplies both sides by $K(x-u')$ and integrates over $x$ one obtains $$\int g(x) \ K(x-u') \ dx = \int f(u)du \int dx \ G(x-u) \ K(x-u') \qquad (6)$$

If the $x$ integral satisfies the condition $$\int G(x-u) \ K(x-u') \ dx = \delta(u-u') \qquad (7)$$

where the right hand side is the well known Dirac delta function then one obtains the Equation 5a from Equation 6.

Hence Equation 7 serves to define the filter function $K(x-u)$ in terms of $G(x-u)$. Techniques for calculating $K(x-u)$ are well known for given values of $G(x-u)$. Mathematically $K(x-u)$ is written as $$K(x-u) = G^{-1}(x-u)$$

or $$K \cdot G = 1$$

and K is called the mathematical inverse operator to G.

An expression of the form of the right hand side of Equation 3

$$g(x) = \int f(u) \, G(x-u) du \quad (3)$$

is called a convolution integral. It is defined to be an integral of the product of one function $f(u)$ with another function whose argument is displaced by an additive or subtractive variable $G(x-u)$. One can show that in a convolution integral equation like 3 $G(x-u)$ has the significance of an electrical filter. This is shown as follows: One takes the Fourier transform of both sides of 3 to obtain $$\bar{g}(w) = \bar{f}(w) \cdot \bar{G}(w) \quad (8)$$

In this Equation 8 $w$ is the frequency and $\bar{g}, \bar{f}, \bar{G}$, are respectively the Fourier transforms of $g(x)$, $f(x)$ and $G(x)$. Equation 8 is a consequence of the convolution theorem of Fourier analysis which asserts that the Fourier transform of a convolution integral is the product of the Fourier transforms of the product functions within the integral.

Equation 8 gives $\bar{G}(w)$ the significance of a filter because at each frequency $w$ it signifies that a fraction $\bar{G}(w)$ of the information spectrum $\bar{f}(w)$ can pass into the received signal spectrum $\bar{g}(w)$. The equivalence between convolution integrals in time and frequency filtering is described in many references in connection with matched filtering and correlation detection in electronics. See for example Skolniks "Introduction to Radar Systems" McGraw Hill 1962, chapter 9, pp. 408, 412, 418 as well as many other references.

In general the filter function $G(x) = A(x/R) W(x)$ can be determined empirically by observing the time response to a sharp pulse. $W(x)$ is the signal return from a point reflector at $x$, which can be experimentally determined. However, in the absence of attenuation by the propagation medium one can show that $$W(x-u) = \exp j(4\pi/\lambda) \sqrt{R^2 + (x-u)^2}$$

$$G(x-u) = A[(x-u)/R] \exp j(4\pi/\lambda) \sqrt{R^2 + (x-u)^2}$$

From Equation 7 one can show that in this case $$K(x-u) = A[(x-u)/R] \exp -j(4\pi/\lambda) \sqrt{R^2 + (x-u)^2}$$

When the propagating medium attenuates the ultrasonic wave one finds that $$G(x-u) = A[(x-u)/R] \exp [j(4\pi/\lambda) \sqrt{R^2+(x-u)^2} -2\beta \sqrt{R^2+(x+u)^2}]$$

where $\beta$ is the attenuation coefficient per unit length for the propagation medium. This filter function takes into account (a) the transducer beam pattern, (b) the point reflection function (c) the curvature of the wavefront, (d) the attenuation of the path. The inverse filter function corresponding to $G(x-u)$ can be obtained by solving Equation 7.

From the filter function one can see that the attenuation in an ultrasonic medium is $\exp -2\beta \sqrt{R^2+(x-u)^2}$. One can compensate for this attenuation by inserting a time varying gain for each pulse of the form $$G(t) = \exp \beta c t$$

where $$t = (2/c) \sqrt{R^2+(x-u)^2}$$

It will be understood that techniques are well known in radar receiver design for utilizing time varying gain to compensate for attenuation by the medium. Skolnik, op cit for example, describes the following techniques:

1. STC or sensitivity time control, to increase the gain with time to make up for attenuation in the propagation medium.
2. The "logarithmic receiver" in which gain varies exponentially with signal level It will be understood that the filter functions $G(x)$ and $K(x)$ can be determined empirically for each geometry and each medium to determine the gain variation required to compensate for range attenuation, since $\beta$ may vary with range, with the medium and the geometry. $\beta$ may also vary with the beam direction when "beam rocking" is performed by adjusting the phases to get all angles of incidence, as previously described. The empirical determination is understood to mean the measurement of the time pulse form from a unit amplitude reflecting point.

There are two approaches to incorporating a time varying gain in the inverse filter function $K(x)$ which characterizes the propagation medium: (1) the gain can be applied to $g(t)$ before processing with the inverse filter function. Then the filter function will refer to the range-adjusted $g(t)$. The following form will be an approximation to it. Using the previously given expression $$G(x) = A(x/R) \exp j(4\pi/\lambda) \sqrt{R^2+x^2}$$

one obtains from Equation 7

$$K(x) = A(x/R) \exp -j(4\pi/\lambda) \sqrt{R^2+x^2}$$

2. The gain can be considered part of the filter. In this case the empirically determined filter function can be used for $K(x)$.

In summary, the present invention requires processing of the detected signal $g(t)$ by convoluting it with the inverse filter function $K(x)$, in accordance with Equations 5. $K(x)$ can be determined for each ultrasonic propagation medium by empirical or experimental methods, although approximation formulas may be used. However its significance can be precisely stated as follows, in terms of the previously defined concepts. If one defines the direct filter function $G(x)$ to be the one determined by the ultrasonic propagation medium for a point reflection return signal for the given transducer, then $K(x)$ is the filter function that is mathematically inverse to it. This can be expressed by the following definition. $K(x)$ is the mathematically inverse filter function characterising a point reflection return signal in the ultrasonic propagation medium for the transducer.

The objective of the present invention is to produce a processed signal proportional to $f(u)$ which characterizes the reflecting body scattering amplitude with high resolution. This processed signal can then be viewed on an oscilloscope or cathode ray tube to display a high resolution image by inserting it as the input with an appropriate sweep. Alternatively one can store it for later display or for subsequent processing or one can produce a photograph from it by electro-optical means, retaining the high resolution image property.

This processed signal proportional to $f(u)$ can be extracted from the $g(x)$ obtained from coherent pulsing and coherent detection by convoluting it with the inverse filter function in accordance with Equation 5a or 5b. A number of methods can be used for processing the signal data $g(x)$ to produce $f(u)$. These methods are well developed with established techniques and equipment which are directly applicable to obtaining the processed signal proportional to $f(u)$. Among these methods are the following:

1. Digital processing by Fourier transform methods
2. Analogue processing by electrical circuits
3. Optical analogue processing
4. Digital processing by direct integration Digital processing by Fourier transform methods proceeds as follows. The detected signal $g(x)$ is inputted to a small digital computer which performs the FFT (Fast Fourier Transform) algorithm in real time. This produces $g(w)$ which is transmitted serially point by point to a multiplying circuit. An electronic function generator in which the Fourier transform $K(w)$ of the inverse filter function is stored, produces this function in a point-by-point serial fashion and sends it to the same multiplying circuit. The multiplier produces the product $$\bar{g}(w) \cdot \bar{K}(w) = \bar{f}(w)$$

which is the fourier transform of $f(u)$. $\bar{f}(w)$ is sent to another digital computer which calculates the inverse fourier transform using the FFT algorithm. Thus $f(u)$ is the output of the second FFT computer. It can then be stored in memory or displayed on a cathode ray tube oscilloscope in real time.

Analogue processing of the detected signal by electrical circuit methods can be implemented as follows: A bank of electrical filter circuits is used to analyze $g(t)$ into its Fourier components. The fourier transform $\bar{g}(w)$ is then sent into an electrical filter circuit representation of $\bar{K}(w)$. The outputs of the individual frequency components of this filter represent $\bar{f}(w)$. These individual frequency components each modulate an oscillator at its frequency. The sum of the oscillator outputs is the serial time function form of $f(t)$.

Optical processing of the detected signal can be performed in many ways. One method is as follows. One first records the detected signal from each range sweep of each transducer on film. Each such range sweep recording is a hologram since it includes phase information on the reflected signal. This hologram can be reconstructed by laser light transmitted through a film. The reconstructed holograms can be summed by an appropriate lens and the sums recorded on film to give $f(u)$. A detailed technology of optical processing for solving convolution equations is available.

The following considerations are pertinent to image extraction processing. A sweep of range values is produced from a single transducer pulse. The pulse return signal time function produces a range sweep return, not a complete image signal. It is the traversal of the transducer over its entire sequence of pulsing positions, or the pulsing of the successive transducer array elements, which does give the complete image signal. When the back-reflected returns from the set of pulses across the array of transducer positions is collected one has the values of the $g(x)$ function integral for all values of $x$. The $x$ values correspond to the sensing transducer positions.

Many transducer pulsing traverses, each containing the complete image information, can then be added together to increase the image signal and the signal to noise ratio. However, the separate pulsing traverses must be added in appropriately classified memory storage compartments. A memory storage system can therefore be used to aid in processing the image. A simple and effective storage method, for example, would be a magnetic tape or drum whose rotation period is synchronous with the transducer pulsing traverse time, on which the signal is stored in analogue form by a magnetic writing head. The stored signal can be read off by a magnetic pickup head for display on a cathode ray tube, for example, with a long storage time screen.

Since the signal returns are coherent and contain phase information, they can be added to produce cancellation of noise. This is a feature not found in incoherent scanners currently available. The summation for noise cancellation can be performed either in $g(x)$ or $f(u)$ since both are amplitude functions with phase information. Thus one can do many image scans, each with lower pulse power, to obtain the same total image signal and the same signal to noise ratio as with a high power pulse scan, if this noise cancellation feature is used.

The rocking beam method, described previously, wherein scan traverses are made at various angles of beam incidence on the target, will also include addition of the individual scan image signals, either coherently with storage, or incoherently, by use of the cathode ray tube screen as the memory medium. The pulsing rates and information content required in a typical image signal can be illustrated by a typical design example for the system. Consider an array 30 centimeters long scanned by a one megacycle ultrasonic wave. The wavelength is 1.5 millimeters and a transducer diameter of 1.5 millimeters will be selected, leading to a transducer beam angle of about 37.5°. If the minimum azimuthal resolved width at the reflecting body is assumed to be 1.5 millimeters, one obtains 200 azimuthal resolution elements since $$30 \text{ cm}/0.15 \text{ cm} = 200$$

A sensing transducer array of 100 elements, each 1.5 millimeters in diameter, with a center-to-center spacing of 3 millimeters, can be selected, and the sensing transducers can be used as the radiation transducers. Each transducer will be used to sense only its own pulse return. Alternatively a single transducer of 1.5 mm diameter moving along a linear traverse can be used, in which pulses are produced every three mm. The length of the transducer array or of the traverse will then be 30 cm.

Consider a maximum range of ten cm from the transducer array to the reflecting body in the ultrasonic propagation medium. The time for a range sweep from a transducer to the reflecting body, including return time is about 200 microseconds. This will permit 5,000 pulses per second without pulse overlap. Since some overlap can be permitted without ambiguity one can actually tolerate 10,000 pulses per second in an array of transducers which are electronically pulsed. Since 100 pulses are used per picture for each scan of the entire 100 transducer array, one can produce 50 to 100 complete image pictures per second.

The pulse can be as narrow in time as two ultrasonic cycles. Since a cycle time for a one megacycle ultrasonic wave is one microsecond, this give a time pulse width of 2 microseconds. The number of range elements is given by the time for a one way range signal, which is about 100 microseconds, divided by 2 microseconds, leading to 50 range elements. The total number of resolution elements per picture is therefore 50 range elements times 200 resolution elements, or 10,000 resolution elements.

The relation between the required frequency bandwidth $\beta$ in the processor, and the time T per picture is $$B \cdot T = \tfrac{1}{2} E_R$$

where $E_R$ is the number of resolution elements, which we have seen is 10,000 for the design example. Selecting a processing rate of two pictures per second, one has $$T = \tfrac{1}{2} \text{ sec}$$

$$B = 2 \cdot \tfrac{1}{2} \cdot 10^4 = 10 \text{ kilocycles/sec}$$

A processing bandwidth of 10 kilocycles/sec can be obtained in real time with an electronic fourier spectrum analyzer using the Fast Fourier Transform algorithm. If, however, a much higher picture processing rate is desired, e.g., 50 pictures per second, then $$T = (1/5u) \text{ sec}$$

$$B = 50 \cdot \tfrac{1}{2} \cdot 10^4 = 250 \text{ kilocycles}$$

At the present this bandwidth can be most conveniently obtained in real time by an optical fourier spectrum analyzer. If, however, the signals are stored, e.g., on magnetic tape before being processed, even this rate of processing can be performed with an electronic spectrum analyzer using the Fast Fourier Transform algorithm.

It will be realized that many design variations of this general type can be made, and that a variety of obvious variations in the processing bandwidth and type of processor can be used.

The dimensions and spacing of the transducer replication, i.e., of the sequence of positions at which the radiation transducers are pulsed, and at which the sensing transducers receive the back reflected signal, may be specified from well known conditions on optical grating radiation patterns, as given for example by Ditchburns "Optics". It is well known that the same conditions apply for all wave phenomena.

The requirement on the length of the traverse or the length of the array, denoted L, comes from the requirement that the specified azimuthal resolution $\Delta U$ must be obtained. The resolution $\Delta U$ obtainable from an aperture can be expressed by $$\Delta U \geq \lambda/\alpha$$

where $\lambda$ is the ultrasonic wavelength and $\alpha$ is the aspect angle of the aperture as seen from the reflecting body. If the reflecting body is at a maximum range R, then $$\alpha = L/R$$

One therefore obtains the condition that $$L/\lambda \geq R/\Delta u$$

The traverse or array length, measured in units of the ultrasonic wavelength must be greater than or equal to the ratio of the maximum range to the minimum azimuthal resolved width which is specified.

The spacing of transducer replication, i.e., in the array, or the spacing of transducer pulsing (or receiving) positions on the traverse, is given by the relation between the transducer diameter, $d$, and the center-to-center spacing S between transducers. It is well known that a discrete array of transducers will behave like a continuous array if S is not too much greater than $d$. A reasonable upper limit on this relation can be shown to be that $$S/d < 5$$

These conditions on an array of transducer pulsing and sensing positions apply not only in one dimension, but in each dimension of the array. It will be understood that it may be advantageous to set up the array of transducer positions in two or three dimensions. If this is done one can obtain laminar slice images in two or three dimensions, simultaneously or successively. It will be understood that each linear dimension of pulses and pulse returns can be sensed, detected and processed separately. It is only necessary to program the pulsing sequence in the appropriate order, and to program the convolution processing accordingly. This is a well known technique in optical, electromagnetic, and acoustical array technology. The conditions on the array given above then apply independently in each linear dimension of the array when it is two or three dimensional in extent.

The scanning method described above has been expressed to refer to wide angle beam scanning of the reflecting body, e.g., by a single wide-angle radiation transducer which produces a wide angled ultrasonic beam. Typically, this wil be obtained when a sensing transducer must have a large beamwidth to obtain good resolution. In this method both the intensity and phase of the ultrasonic "illumination" incident in the target reflecting body will vary from point to point with distance from the transducer.

Another type of pulsing can be used which has the advantage of greater signal power, thus enhancing the reflected signal to noise ratio. This can be termed uniform phase scanning. In this method of scanning a plane wave will be incident on those portions of the reflected body which are scanned in any one pulse. Since a plane wave corresponds to a uniform phase incident on all target points, one can call this uniform phase illumination. It will be seen that uniform phase illumination requires a large radiation transducer or its equivalent. It will therefore produce higher pulse power; since a larger diameter transducer is used the power may be 10 to 30 DB higher than in wide angle pulsing. It may also have the advantage of a more rapid scanning, i.e., more pulses in a given time.

Uniform phase illumination can be achieved in several ways:

1. A broad area collimated beam is produced by a large diameter radiation transducer. For example, a diameter of 10 ultrasonic wavelengths will produce 100 times the power of a one-wavelength diameter, and will confine its beam to a 4° cone angle. Only those parts of the reflecting body within the collimation area of the beam receive a substantial illumination. The pulsing transducer is moved from one position to another in the course of the scanning. Thus the entire target area is covered by the uniform phase illumination over the course of the scan.

2. An array of such large radiation transducers can be simultaneously pulsed. This array can be large enough to cover a substantial portion of the reflecting body or the entire body simultaneously with a uniform phase illumination. Again the advantages are those of higher incident power and more rapid scanning.

3. An array of sensing transducers used as radiation transducers can be simultaneously pulsed, thus increasing the pulsed power incident on any point. Simultaneous pulsing by an entire array of wide angled transducers is equivalent to a single uniform phase pulse, i.e., a plane parallel wave pulse, since the individual pulse geometries, if closely spaced, tend to fill each other in to give uniform phase illumination. Furthermore, only the rays which are approximately parallel to the beam direction will contribute substantially, since the slant rays will be more greatly attenuated by the medium and will therefore contribute much less than the parallel rays. (In the case of a steered beam at an angle to the array, when time variable gain is used to null out the attenuation effects of range, only those rays in the beam direction will contribute substantially for a given range value.)

4. A single stationary radiation transducer of large diameter may be used.

For all of these methods one can show that integration over all transducer positions will eliminate the dependence of the integral analogous to Equation 3 on the radiation transducer position variable due to the transducer location. It does not eliminate the dependence on the sensing transducer location, of course. This is another reason why uniform phase illumination tends to result from a series of partial pulse illuminations covering the entire azimuthal range.

The effect of uniform phase illumination on the filter function is this: the filter function will depend on the target position only in terms of the one-way path from the reflecting point to the sensing transducer. The range dependence on R for the path to the target will be uniform for all target points. It can be nulled out by using range variable gain. The filter function will therefore have the same form as in the previous discussion, except that it will involve the one-way path instead of the two way path.

We now consider the manner of multiplexing the sensing transducer outputs for uniform phase illumination, and the manner of combining these outputs for detection and processing to obtain the final processed signal with the high resolution image information.

In the case of partial illumination of the target scene in each pulse, obtained by methods 1 and 2 (if the array in 2 does not cover the entire target scene) it will be realized that only a part of Equation 3 is evaluated for each pulse.

$$g(x) = \int_{x-u_{min}}^{x+u_{max}} f(u) A\left(\frac{x-u}{R}\right) W(x-u) du$$

Each pulse has the effect of selecting a range of U values, which we denote by $\Delta U_n$, to be non-zero. One therefore obtains a section of the integral, denoted $g(x|\Delta U_n)$ $$g(x|\Delta u_n) = \int_{u}^{u+\Delta u_n} f(u) A\left(\frac{x-u}{R}\right) W(x-u) du$$

in each pulse. The complete integral $g(x)$ is obtained by adding up these sections $$g(x) = \sum_n g(x|\Delta u_n)$$

Each partial integral section $g(x|\Delta U_n)$ is evaluated at sensor transducer locations for each $x$ value. The partial integral sections can then be additively combined to obtain $g(x)$. It should be noted that the processing to be performed on $g(x)$ to obtain $f(u)$ can also be performed additively on each partial integral to obtain the $f(u)$ values within its U range. The results can then be added or pieced together to obtain the entire function.

For each radiation pulse one collects the sensing transducer outputs over the entire traverse of transducer locations. This may be done in three ways:

a. If an array of sensing transducers is used one can collect their outputs simultaneously from a single radiation pulse. These outputs can then be combined in serial order into a single time function in the following way. A time delay element corresponding to a single range sweep time is placed in series with the second transducer, a time delay element corresponding to two range sweep intervals is placed in series with the third transducer, etc. The outputs are then connected to a common bus bar which gives a serial time function of their outputs which corresponds to the partial integral $g(x|\Delta U_n)$. The radiation transducer is then moved to another location to obtain the next partial integral, and so on. Another possibility is to store the outputs of the individual sensing transducers in memory elements and then to read out these stored signals to combine them.

b. Another procedure that is possible with an array of sensing transducers is to collect their outputs simultaneously from a single radiation pulse, and to process these outputs simultaneously according to the convolution calculation previously described, with obvious modifications for simultaneous processing.

c. One may collect the output of a single selected sensor trans-ducer after each radiation pulse. This would require repeating the radiation pulse many times for each partial integral section, one for each sensing transducer location. This method requires only one moving sensing transducer, although a multi-plexed array can also be used. It is slower than methods (a) and (b).

In the case of complete target illumination per pulse, using irradiation methods 2, 3, or 4, one can obtain the entire signal function $g(x)$ from a single pulse return. Here, too, however, either of the three sensing transducer methods (a), (b), or (c) can be used. In this case, however, the sensor output can be the entire signal function $g(x)$, and after processing, the entire reflecting body processed signal $f(u)$.

In the description of this invention given above it has been assumed that the ultrasonic radiation will be emitted in short pulses. The advantage of pulsed radiation is that the return time of the relfected signal is proportional to the range to the reflection point. The use of pulsed radiation gives range data as well as azimuthal data. It will be realized, however, that there are situations in which range data is not necessary. In such situations, it will be understood, one can utilize time continuous ultrasonic radiation to give azimuthal images with high resolution without producing any range data.

Time continuous ultrasonic waves can be used for high resolution imaging in a manner very similar to that described for pulsed radiation. The ultrasonic sensing transducer must have sensitivity over an angular width whose lower limit depends on the ratio of ultrasonic wavelength to the specified minimum azimuthal resolved width, as previously described. A method of replicating the ultrasonic sensing transducer at a sequence of positions across an aperture must be provided. At least one ultrasonic radiation transducer must be provided. The radiation transducer must be energized from a phase coherent source which produces a continuous electrical phase stable electrical oscillation at the ultrasonic frequency. The ultrasonic radiation transducer must therefore produce a time continuous phase coherent ultrasonic wave. In many forms of this invention the phase coherent ultrasonic transducer will be replicated at a sequence of positions across an aperture. The replication means can be any of those previously described, for either the sensing transducer or the radiation transducer.

For example, the radiating transducer can be moved across the aperture while continuously radiating. Alternatively one may utilize an array of radiating transducers and the radiation may be sequentially switched from one position in this array to the next. Similarly, the sensing transducer can be moved across the aperture while continuously sensing, or it can sense only in certain fixed positions. Alternatively one may utilize an array of sensing transducers. A sequence of signal time function segments can be selected from the sensing transducer positions by means of multiplexers or electronic switches. These signal time function segments are the back-reflected signals incident at the replicated sequence of sensing transducer positions.

As previously described, means for detection must be provided for this sequence of signal time function segments back-reflected from the reflected body and incident at said replicated sequence of sensing transducer positions. The detector must preserve the phase of these back reflected signals. The same detection methods described above are applicable.

As in the pulsed method, a mathematical operation of convolution processing must be performed on the detected signal in the time continuous radiation case in order to extract the high resolution signal. This mathematical processing is identical to the convolution processing described above except for the specification of the inverse filter function to be used. For time continuous radiation one will specify an inverse filter function that incorporates ones pre-knowledge of the targets range variation.

When the pulsed method is used the inverse filter function incorporates the range as a continuously varying parameter, and as the time signal unfolds after each pulse the instantaneous inverse filter value uses the range for that time value. In the time continuous radiation procedure, one will select an inverse filter function that is appropriate to the known range of the target, or of the known range limits. For example, if one knows that the target is at a given range, one can use an inverse filter function corresponding to this range. If one knows the target varies between two range values one can utilize an inverse filter function in which the range varies between these values.

It should be pointed out that the same transducer can be used for radiation and detection for a quasi-time continuous radiation. In this case the radiation cannot be time continuous in a strict sense, since the transducer must be switched from transmitting to sensing mode. However, the transmitting period can be many cycles long, e.g., one hundred cycles or more, before the first reflected wave returns. Hence this mode of operations resembles that of time continuous operation.

While the description of high resolution ultrasonic imaging scanners and structural embodiments relating to it have been set forth above, it will be appreciated that other obvious variations can be made in carrying out the invention disclosed herein. Accordingly, such variations falling within the purview of this invention may be made without in any way departing from the spirit of the invention or sacrificing any of the attendent advantages thereof, providing however that such changes fall within the scope of the claims appended here to.

What is claimed is:

1. An ultrasonic imaging scanner wherein a reflecting body in an ultrasonic propagation medium is scanned along a predetermined path or aperture by ultrasonic pulses to produce a processed image signal time function for high resolution imaging of said reflecting body with specified azimuthal resolved width, comprising in combination a. at least one ultrasonic sensing transducer whose width in the azimuthal direction is less than the specified azimuthal resolved width
   b. means for replication of said ultrasonic sensing transducer at a sequence of positions across said aperture, wherein the aperture length measured in units of the ultrasonic wavelength, must exceed the ratio of the maximum range of said reflecting body, to the specified azimuthal resolved width
   c. at least one ultrasonic radiation transducer
   d. means for successively pulsing said ultrasonic transducer wherein successive pulses are phase coherent with one another
   e. means for detection of a sequence of ultrasonic pulse signal time functions, back reflected from said reflecting body and incident at said replicated sequence of sensing transducer positions, wherein the phase of said reflected pulse signals is preserved by said detection means
   f. means for mathematical processing of said detected sequence of reflected ultrasonic pulse signal time functions, by convolution calculation of said detected sequence of reflected pulse time functions with a prescribed filter function, which is mathematically inverse to the filter function characterising a unit amplitude reflecting point return signal from said radiation transducer to said replicated sensing transducer positions in said ultrasonic propagation medium; said means including means for fourier analysis of the azimuthal variation of said detected sequence at each range, means for generating a fourier transform signal of said prescribed filter function at each range, means for forming the product function of said fourier transforms, and means for inverse fourier analysis of said product function at each range, said inverse fourier analysed function comprising said processed image signal time function for high resolution imaging.

2. An ultrasonic imaging scanner as defined in claim 1 including means for replication of said ultrasonic radiation transducer at a sequence of positions across said aperture.

3. An ultrasonic imaging scanner as defined in claim 2 wherein means for traversing said ultrasonic sensing transducer into a sequence of positions is utilized as means for replication of said ultrasonic sensing transducer at a sequence of positions.

4. An ultrasonic imaging scanner as defined in claim 2 wherein a fixed array of ultrasonic sensing transducers is utilized as means for replication of said ultrasonic sensing transducer at a sequence of positions.

5. An ultrasonic imaging scanner as defined in claim 2 wherein means for traversing said ultrasonic radiation transducer into a sequence of positions is utilized as means for replication of said ultrasonic radiation transducer at a sequence of positions.

6. An ultrasonic imaging scanner as defined in claim 2 wherein a fixed array of ultrasonic radiation transducers is utilized as means for replication of said ultrasonic radiation transducer at a sequence of positions.

7. An ultrasonic imaging scanner as defined in claim 5 wherein means for traversing said ultrasonic sensing transducer into a sequence of positions is utilized as means for replication of said ultrasonic sensing transducer at a sequence of positions.

8. An ultrasonic imaging scanner as defined in claim 1 wherein the sensing transducer and the radiation transducer are one and the same.

9. An ultrasonic imaging scanner as defined in claim 2 wherein the sensing transducer and the radiation transducer are one and the same.

10. An ultrasonic imaging scanner as defined in claim 1 including means for selecting for detection the sequence of back-reflected ultrasonic pulse signal time functions incident at the replicated sequence of sensing transducer positions.

11. An ultrasonic imaging scanner as defined in claim 1 wherein the spacing between adjacent replicated positions of said sensing transducer is less than five times the width of said sensing transducer in the azimuthal direction.

12. An ultrasonic imaging scanner as defined in claim 3 wherein said sensing transducer traverses a sequence of positions along a straight line at constant speed.

13. An ultrasonic imaging scanner as defined in claim 3 wherein said sensing transducer traverses a sequence of positions along a straight line and wherein its sequence of positions at the times when said radiation transducer is pulsed, are equally spaced.

14. An ultrasonic imaging scanner as defined in claim 1 wherein said pulses are produced from a phase coherent ultrasonic oscillator and wherein the pulse initiation times are selected to produce said pulses in predetermined phase relationship with one another.

15. An ultrasonic imaging scanner as defined in claim 1 wherein said pulsings of said ultrasonic radiation transducer are initiated at positions and in phase relationship to one another corresponding to phased array contributions for a monodirectional coherent ultrasonic beam.

16. An ultrasonic imaging scanner as defined in claim 2 wherein means are provided for pulsing said radiation transducer in said positions in a prescribed sequence with a phase coherent oscillator source and wherein said pulses are initiated in predetermined phase relationship with one another.

17. An ultrasonic imaging scanner as defined in claim 1 wherein a multiplicity of radiation transducers are pulsed simultaneously in phase with one another.

18. An ultrasonic imaging scanner as defined in claim 1 including a multiplicity of sensing transducers and including means for selecting and combining the individual outputs of said sensing transducers into a predetermined sequence.

19. An ultrasonic imaging scanner as defined in claim 4 wherein each said sensing transducer includes a time delay element.

20. An ultrasonic imaging scanner as defined in claim 18 wherein said selection means includes a time delay element for each sensing transducer output, wherein said time delay elements separate said reflected pulse signal time functions from one another to produce a serial pulse signal time function sequence.

21. An ultrasonic imaging scanner as defined in claim 4 wherein a fixed array of ultrasonic radiation transducers is utilized as means for replication of said ultrasonic radiation transducer at a sequence of positions, and wherein said sensing transducer array and said radiation transducer array are one and the same.

22. An ultrasonic imaging scanner as defined in claim 21 wherein each transducer is pulsed individually in predetermined sequence and wherein each said reflected ultrasonic pulse signal time function is selected for detection at the transducer originating said pulse.

23. An ultrasonic imaging scanner as defined in claim 21 wherein each transducer is pulsed individually in predetermined sequence, and wherein each said reflected utrasonic pulse signal time function is selected for detection at a specified transducer of the array, and wherein means are provided for selecting the individual outputs of said transducers into a predetermined serial sequence.

24. An ultrasonic imaging scanner as defined in claim 21 wherein a multiplicity of transducers are pulsed simultaneously and wherein means are provided for selecting the individual outputs of said transducers for individual detection and processing.

25. An ultrasonic imaging scanner wherein a reflecting body in an ultrasonic propagation medium is scanned along a predetermined path or aperture by ultrasonic waves to produce a processed image signal time function for high resolution imaging of said reflecting body with specified azimuthal resolved width, comprising in combination a. at least one ultrasonic sensing transducer whose width in the azimuthal direction is less than the specified azimuthal resolved width b. means for replication of said ultrasonic sensing transducer at a sequence of positions across said aperture, wherein the aperture length measured in units of the ultrasonic wavelength, must exceed the ratio of the maximum range of said reflecting body, to the specified azimuthal resolved width c. at least one ultrasonic radiation transducer
d. means for producing time continuous ultrasonic radiation from said ultrasonic radiation transducer, wherein said time continuous ultrasonic radiation is phase coherent
e. means for selection of a sequence of signal time function segments back reflected from said reflecting body and incident at said replicated sequence of sensing transducer positions, and means for detection of said sequence of back-reflected signal time segments, wherein the phase of said sequence of reflected signal time function segments is preserved by said detection means
f. means for mathematical processing of said detected sequence of reflected ultrasonic signal time function segments, by convolution calculation of said detected sequence of signals with a prescribed filter function corresponding to a specified range, which is mathematically inverse to the filter function characterising a unit amplitude reflecting point return signal at said range from said radiation transducer to said replicated sensing transducer positions in said ultrasonic propagation medium; said means including means for fourier analysis of the azimuthal variation of said detected sequence at said range, means for generating a fourier transform signal of said prescribed filter function at said range, means for forming the product function of said fourier transforms, and means for inverse fourier analysis of said product function at said range, said inverse fourier analysed function comprising said processed image signal time function for high resolution imaging.

* * * * *

UNITED STATES PATENT OFFICE
CERTIFICATE OF CORRECTION

Patent No. 3,805,596                    Dated April 23, 1974

Inventor(s) Carl N. Klahr

It is certified that error appears in the above-identified patent and that said Letters Patent are hereby corrected as shown below:

Col. 1, line 49, "material" should read --materials--
"    3  "   37, "minamal" should read --minimal--
"   20  "   34, "transforms" should read --transform--
"   25  "   28, insert --of-- after "wavefront"

"   31  "   21, "K(w)" should read --$\overline{K}$(w)--
"   33  "   31, "T=(1/5u) sec" should read --T=1/50 sec--
"   36  "   3-4, "g(x $\Delta$ $U_n$)" should read --g(x/$\Delta$ $U_n$)--

"   37  "   6, "relfected" should read --reflected--

Signed and sealed this 15th day of October 1974.

(SEAL)
Attest:

McCOY M. GIBSON JR.                     C. MARSHALL DANN
Attesting Officer                       Commissioner of Patents